US008941638B2

(12) United States Patent
Ebisuno et al.

(10) Patent No.: US 8,941,638 B2
(45) Date of Patent: Jan. 27, 2015

(54) DISPLAY DEVICE

(75) Inventors: Kouhei Ebisuno, Kyoto (JP); Toshiyuki Kato, Osaka (JP)

(73) Assignee: Panasonic Corporation, Osaka (JP)

( * ) Notice: Subject to any disclaimer, the term of this patent is extended or adjusted under 35 U.S.C. 154(b) by 104 days.

(21) Appl. No.: 13/495,303

(22) Filed: Jun. 13, 2012

(65) Prior Publication Data

US 2013/0009939 A1 Jan. 10, 2013

Related U.S. Application Data

(63) Continuation of application No. PCT/JP2011/003885, filed on Jul. 6, 2011.

(51) Int. Cl.
*G06F 1/26* (2006.01)
*G09G 3/32* (2006.01)

(52) U.S. Cl.
CPC ........ *G09G 3/3233* (2013.01); *G09G 2320/029* (2013.01); *G09G 2330/028* (2013.01)
USPC .......................................................... 345/212

(58) Field of Classification Search
USPC ........... 315/169.1, 366; 345/76, 77, 102, 212, 345/214, 690
See application file for complete search history.

(56) References Cited

U.S. PATENT DOCUMENTS 7,071,635 B2 7/2006 Inoue et al.
7,872,619 B2 1/2011 Miller et al.
7,973,745 B2 7/2011 Mizukoshi et al.
2003/0201727 A1* 10/2003 Yamazaki et al. ......... 315/169.1
2004/0183483 A1 9/2004 Inoue et al.
2008/0100542 A1* 5/2008 Miller et al. .................... 345/77
2008/0266216 A1* 10/2008 Choi .............................. 345/77
2008/0284688 A1 11/2008 Marx et al.
2009/0207106 A1 8/2009 Mizukoshi et al.
2009/0225072 A1 9/2009 Mizukoshi et al.
2010/0020065 A1 1/2010 Takasugi
2010/0026732 A1 2/2010 Otawara
2010/0109985 A1 5/2010 Ono
2010/0171774 A1 7/2010 Mizukoshi et al.
2011/0242087 A1 10/2011 Ebisuno et al.

FOREIGN PATENT DOCUMENTS

JP 2003-280590 10/2003
JP 2006-65148 3/2006

(Continued)

*Primary Examiner* — Dwayne Bost
*Assistant Examiner* — Sepehr Azari
(74) *Attorney, Agent, or Firm* — Greenblum & Bernstein, P.L.C.

(57) ABSTRACT

A display device according to the present disclosure includes: a variable-voltage source supplying power source voltage; an organic EL display unit including power lines on high-potential side and low-potential side that are connected to pixels; a potential difference detecting circuit detecting a potential on the high-potential side of a monitor pixel; a voltage drop amount calculating circuit calculating an amount of voltage drop generated in the power line on the low-potential side from video data and estimating a potential at, at least one point of the power line on the low-potential side; and a signal processing circuit regulating power source voltage to be supplied from the variable voltage source such that a potential difference between the potential on the high-potential side detected by the potential difference detecting circuit and the potential on the low-potential side estimated by the voltage drop amount calculating circuit reaches a predetermined potential difference.

19 Claims, 25 Drawing Sheets

(56) References Cited

FOREIGN PATENT DOCUMENTS

| | | |
|---|---|---|
| JP | 2006-251602 | 9/2006 |
| JP | 2008-502015 | 1/2008 |
| JP | 2008-185809 | 8/2008 |
| JP | 2008-268914 | 11/2008 |
| JP | 2009-31451 | 2/2009 |
| JP | 2009-162980 | 7/2009 |
| JP | 2009-198691 | 9/2009 |
| JP | 2009-216801 | 9/2009 |
| JP | 2010-39046 | 2/2010 |
| JP | 2010-508559 | 3/2010 |
| WO | 03/027999 | 4/2003 |
| WO | 2005/122120 | 12/2005 |
| WO | 2008/057187 | 5/2008 |
| WO | 2009/011092 | 1/2009 |
| WO | 2009/014634 | 1/2009 |
| WO | 2011/086597 | 7/2011 |

* cited by examiner

FIG. 10

| Video data (gradation level) | Required voltage (RED) | Required voltage (Green) | Required voltage (Blue) |
|---|---|---|---|
| 0 | 4 | 4.2 | 3.5 |
| 1 | 4.1 | 4.3 | 3.5 |
| 2 | 4.1 | 4.4 | 3.6 |
| 3 | 4.2 | 4.5 | 3.6 |
| ⋮ | ⋮ | ⋮ | ⋮ |
| 176 | 8.3 | 9.6 | 6.7 |
| 177 | 8.5 | 9.9 | 6.9 |
| ⋮ | ⋮ | ⋮ | ⋮ |
| 253 | 10.5 | 11.4 | 8.2 |
| 254 | 10.8 | 11.8 | 8.3 |
| 255 | 11.2 | 12.2 | 8.4 |

FIG. 11

| Potential difference value [V] | Voltage drop margin |
|---|---|
| 0.0 | 0.0 |
| 0.2 | 0.2 |
| 0.4 | 0.4 |
| 0.6 | 0.6 |
| ⋮ | ⋮ |
| 3.4 | 3.4 |
| 3.6 | 3.6 |
| ⋮ | ⋮ |
| 5.6 | 5.6 |
| 5.8 | 5.8 |
| 6.0 | 6.0 |

FIG. 18

Voltage drop amount [V]

| Block columns / Block rows | 1 | 2 | --- | 8 | --- | 16 |
|---|---|---|---|---|---|---|
| 1 | 0.0 | 0.0 | --- | 0.0 | --- | 0.0 |
| 2 | 1.0 | | --- | 9.0 | --- | 1.0 |
| ⋮ | ⋮ | ⋮ | --- | ⋮ | ⋱ | ⋮ |
| 5 | 1.0 | | --- | 9.0 | --- | 1.0 |
| ⋮ | ⋮ | ⋮ | --- | ⋮ | ⋱ | ⋮ |
| 9 | 0.0 | 0.0 | --- | 0.0 | --- | 0.0 |

Voltage drop amount [V]

| Block rows \ Block columns | 1 | 2 | --- | 16 | --- | 32 |
|---|---|---|---|---|---|---|
| 1 | 0.0 | 0.0 | --- | 0.0 | --- | 0.0 |
| 2 | 0.5 | 1.0 | --- | 8.5 | --- | 0.5 |
| ⋮ | ⋮ | ⋮ | ⋱ | ⋮ | ⋱ | ⋮ |
| 9 | 0.5 | 1.0 | --- | 8.5 | --- | 0.5 |
| ⋮ | ⋮ | ⋮ | ⋱ | ⋮ | ⋱ | ⋮ |
| 18 | 0.0 | 0.0 | --- | 0.0 | --- | 0.0 |

DISPLAY DEVICE

CROSS REFERENCE TO RELATED APPLICATION

This is a continuation application of PCT Patent Application No. PCT/JP2011/003885 filed on Jul. 6, 2011, designating the United States of America. The entire disclosure of the above-identified application, including the specification, drawings and claims are incorporated herein by reference in its entirety.

TECHNICAL FIELD

The present disclosure relates to active-matrix display devices which use current-driven light-emitting elements represented by organic electroluminescence (EL) elements, and more particularly to a display device having excellent power consumption reducing effect.

BACKGROUND ART

In general, the luminance of an organic electroluminescence (EL) element is dependent upon the drive current supplied to the element, and the luminance of the luminescence of the element increases in proportion to the drive current. Therefore, the power consumption of displays made up of organic EL elements is determined by the average of display luminance. Specifically, unlike liquid crystal displays, the power consumption of organic EL displays varies significantly depending on the displayed image.

For example, in an organic EL display, the highest power consumption is required when displaying an all-white image, whereas, in the case of a typical natural image, power consumption which is approximately 20 to 40% that for all-white is considered to be sufficient.

However, because power source circuit design and battery capacity entail designing which assumes the case where the power consumption of a display becomes its highest, it is necessary to consider power consumption that is 3 to 4 times that for the typical natural image, and thus becoming a hindrance to the lowering of power consumption and the miniaturization of devices.

In response there is conventionally proposed a technique which suppresses power consumption with practically no drop in display luminance, by detecting the peak value of video data and adjusting the cathode voltage of the organic EL elements based on such detected data so as to reduce power source voltage (for example, see Patent Reference 1).

CITATION LIST

Patent Literature

[Patent Literature 1] Japanese Unexamined Patent Application Publication No. 2006-065148

SUMMARY OF INVENTION

Technical Problem

Now, since an organic EL element is a current-driven element, current flows through a power source wire and a voltage drop which is proportionate to the wire resistance occurs. As such, the power supply voltage to be supplied to the display is set by adding a voltage drop margin for compensating for a voltage drop. In the same manner as the previously described power source circuit design and battery capacity, since the power drop margin for compensating for a voltage drop is set assuming the case where the power consumption of the display becomes highest, unnecessary power is consumed for typical natural images.

In a small-sized display intended for mobile device use, panel current is small and thus, compared to the voltage to be consumed by pixels, the voltage margin for compensating for a voltage drop is negligibly small. However, when current increases with the enlargement of panels, the voltage drop occurring in the power source wire no longer becomes negligible.

However, in the conventional technique in the above-mentioned Patent Reference 1, although power consumption in each of the pixels can be reduced, the power drop margin for compensating for a voltage drop cannot be reduced, and thus the power consumption reducing effect for household large-sized display devices of 30-inches and above is insufficient.

The present disclosure is conceived in view of the aforementioned problem and is to provide a display device having excellent power consumption reducing effect.

Solution to Problem

In order to achieve the above, the display device according to an aspect of the present disclosure is a display device including: a power supply unit which supplies an output potential on a high-potential side and an output potential on a low-potential side; a display unit including: a plurality of pixels arranged in a matrix; a power line on the high-potential side and a power line on the low-potential side that are connected to each of the pixels, and which receives power supply from the power supply unit; a voltage detecting unit which detects a potential on one of the high-potential side and the low-potential side among potentials applied to at least one of the pixels in the display unit; a voltage estimating unit which calculates an amount of voltage drop generated in the power line on the other of the high-potential side and the low-potential side from video data which is data indicating luminance of each of the pixels and to estimate a potential at, at least one point of the power line; and a voltage regulating unit which regulates at least an output potential on one of the high-potential side and the low-potential side to be supplied from the power supply unit such that a potential difference between the potential on one of the high-potential side and the low-potential side detected by the voltage detecting unit and the potential at the at least one point of the power line estimated by the voltage estimating unit reaches a predetermined potential difference.

Advantageous Effects of Invention

The present disclosure enables the implementation of a display device having excellent power consumption reducing effect.

BRIEF DESCRIPTION OF DRAWINGS

These and other objects, advantages and features of the disclosure will become apparent from the following description thereof taken in conjunction with the accompanying drawings that illustrate a specific embodiment of the present disclosure. In the Drawings:

FIG. 10 is a chart illustrating an example of a required voltage conversion table referred by the signal processing circuit;

FIG. 11 is a chart illustrating an example of a voltage margin conversion table referred by the signal processing circuit;

FIG. 18 is a chart illustrating a voltage drop amount matrix for each block calculated when the blocks are roughly divided;

DESCRIPTION OF EMBODIMENTS

Figure 1:
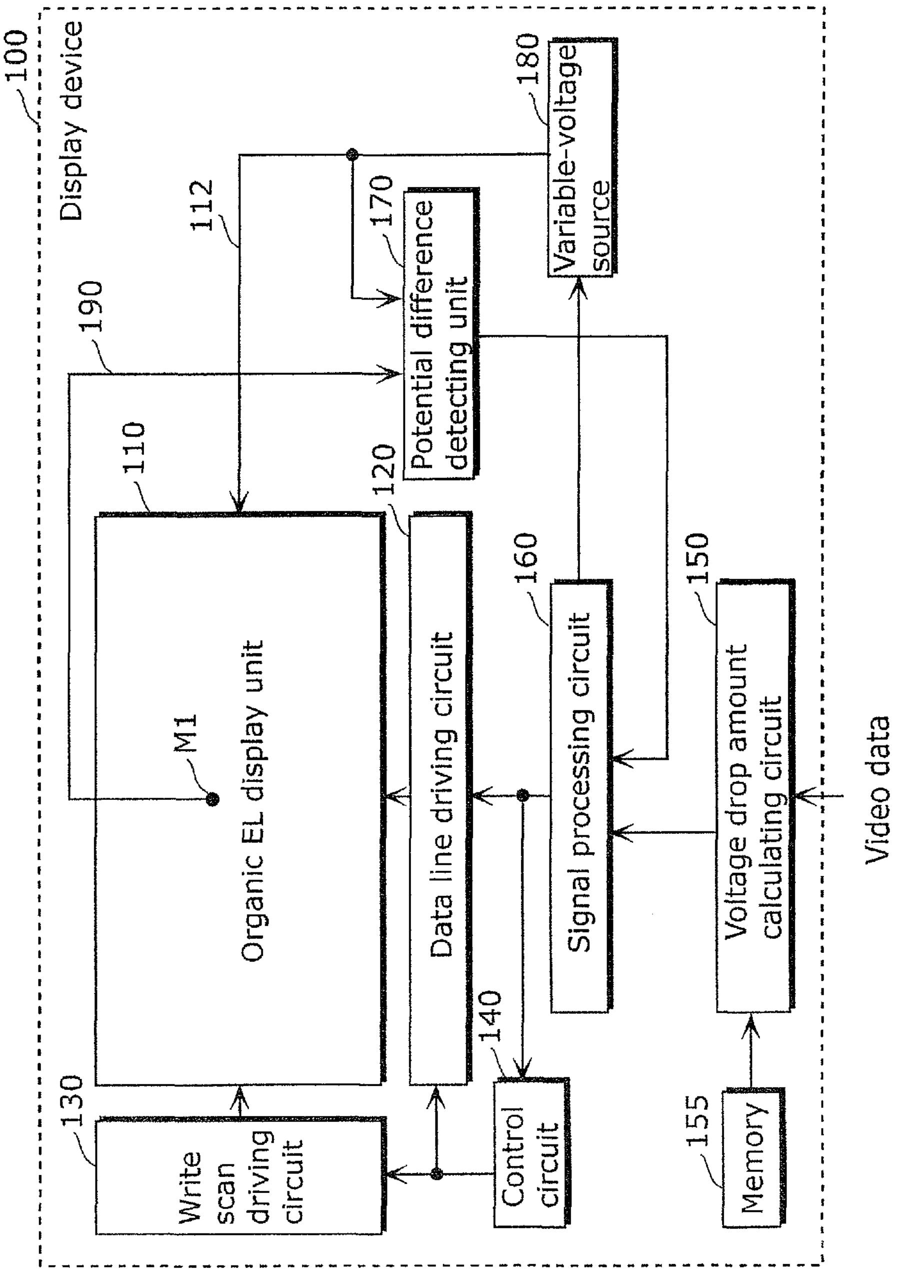
FIG. 1 is a block diagram showing an outline configuration of a display device according to the embodiment 1 of the present disclosure.

The display device according to the present disclosure is a display device including: a power supply unit which supplies an output potential on a high-potential side and an output potential on a low-potential side; a display unit including: a plurality of pixels arranged in a matrix; a power line on the high-potential side and a power line on the low-potential side that are connected to each of the pixels, and which receives power supply from the power supply unit; a voltage detecting unit which detects a potential on one of the high-potential side and the low-potential side among potentials applied to at least one of the pixels in the display unit; a voltage estimating unit which calculates an amount of voltage drop generated in the power line on the other of the high-potential side and the low-potential side from video data which is data indicating luminance of each of the pixels and to estimate a potential at, at least one point of the power line; and a voltage regulating unit which regulates at least an output potential on one of the high-potential side and the low-potential side to be supplied from the power supply unit such that a potential difference between the potential on one of the high-potential side and the low-potential side detected by the voltage detecting unit and the potential at the at least one point of the power line estimated by the voltage estimating unit reaches a predetermined potential difference.

With this, the amount of voltage drop due to the resistance component of the power line is detected on one of the power lines, and is calculated for the other of the power lines, and the amount of voltage drop is fed back to the power supply unit. Therefore, it is possible to reduce excess supply voltage, reducing the power consumption.

Furthermore, compared to a case when both the potentials on the high potential side and the low potential side in the pixel are detected, it is possible to reduce the number of detecting lines for detecting potentials, and the layout change in the display unit can be simplified. Furthermore, compared to the case in which both of the potentials on the high-potential side and the low-potential side are estimated based on the power source line network model, the amount of voltage drop is actually measured on one side of the electrode, which allows setting the power source voltage more precisely. Regulating at least one of the output potentials on the high potential side and the low potential side on the power source unit according to the amount of voltage drop generated from the power source unit to at least one of the pixels allows reducing the power consumption.

Furthermore, an aspect of the display device according to the present disclosure the voltage estimating unit may calculate a distribution of the amount of voltage drop for each of first blocks, and estimate, for each pixel, an amount of voltage drop generated on the power line on the other of the high-potential side and the low-potential side for each pixel, based on the distribution of the amount of voltage drop calculated for the first blocks, each of the first blocks including M pixels obtained by dividing the number of pixels in a row direction and a column direction to be equal, where M is an integer equal to or greater than 2.

With this, the operation amount can be significantly reduced, and thereby reducing the cost as well.

Furthermore, an aspect of the display device according to the present disclosure the voltage estimating unit may further (i) calculate a distribution of the amount of voltage drop for each of second blocks including N pixels obtained by dividing the number of pixels in the column direction and the row direction to be equal, where N is an integer equal to or greater than 2 and is different from M, and (ii) estimate an amount of voltage drop on the power line on the other of the high-potential side and the low-potential side, based on the distribution of the amount of voltage drop calculated for the first blocks and the distribution of the amount of voltage drop calculated for the second blocks.

With this, the voltage can be regulated with high precision with small operation amount. Therefore, the power consumption can be reduced further with low cost.

Furthermore, an aspect of the display device according to the present disclosure the voltage regulating unit may regulate at least an output potential on the high-potential side and the low-potential side to be supplied from the power supply unit, using a largest value in the distribution of the amount of voltage drop estimated.

With this, it is possible to prevent the reduction in luminance of the pixel due to insufficient voltage.

Furthermore, an aspect of the display device according to the present disclosure the voltage detecting unit may detect potentials of the pixels in the display unit.

Furthermore, an aspect of the display device according to the present disclosure the voltage regulating unit may select a smallest potential of potentials on the high-potential side detected by the voltage detecting unit or a largest potential of potentials on the low-potential side detected by the voltage detecting unit, and regulate the power supply unit based on the selected potential.

With this, if there are multiple potentials on the high potential side or the low potential side detected, it is possible to select the smallest or the largest potential of the detected potentials. Therefore, the output potential from the power supply unit can be more accurately regulated. Therefore, power consumption can be effectively reduced even when the size of the display unit is increased.

Furthermore, an aspect of the display device according to the present disclosure may further include a high-potential side detecting line having one end connected to the pixel at which the potential on the high-potential side is detected and the other end connected to the voltage regulating unit, and for transmitting the potential on the high-potential side; or a low-potential side detecting line having one end connected to the pixel at which the potential on the low-potential side is detected and the other end connected to the voltage regulating unit, and for transmitting the potential on the low-potential side.

With this, the voltage detecting unit can detect one of the potentials on the high potential side and the potential on the low potential side in the pixel.

Furthermore, in an aspect of the display device according to the present disclosure each of the pixels may include: a driver including a source electrode and a drain electrode; and a light-emitting element including a first electrode and a second electrode, the first electrode is connected to one of the source electrode and the drain electrode of the driver, one of (i) the other of the source electrode and the drain electrode and (ii) the second electrode is connected to one of the power lines on the high-potential side and the low-potential side, and the other of the source electrode and the drain electrode and the other of the second electrode are connected to the other of the power lines on the high-potential side and the low-potential side.

Furthermore, in an aspect of the display device according to the present disclosure, the second electrode may configure a part of a common electrode provided in common with the pixels, and the common electrode is electrically connected to the power supply unit such that the potential is applied from a periphery of the common electrode.

With this, the closer to the center of the display unit, the higher the amount of voltage drop is. In particular, when the size of the display unit increases, the output potential on the high potential side from the power supply unit and the output potential on the low potential side from the power supply unit can be more appropriately regulated, which reduces the power consumption further.

Furthermore, an aspect of the display device according to the present disclosure the second electrode may be formed of a transparent conductive material made of metal oxide.

Furthermore, an aspect of the display device according to the present disclosure the light-emitting element may be an organic EL element.

With this, the heat is suppressed along the decrease in the power consumption. Therefore, the degradation in the organic EL element can be suppressed.

The following shall describe the exemplary embodiments of the present disclosure with reference to the drawings. Note that, in all the figures, the same reference numerals are given to the same or corresponding elements and redundant description thereof shall be omitted.

Embodiment 1

The display device according to the embodiment 1 includes: a variable-voltage source which supplies an output potential on a high-potential side and an output potential on a low-potential side; an organic EL display unit including: a plurality of pixels arranged in a matrix; a power line on the high-potential side and a power line on the low-potential side that are connected to each of the pixels, and which receives power supply from the variable-voltage source; a potential difference detecting circuit which detects a potential on one of the high-potential side and the low-potential side among potentials applied to at least one of the pixels in the organic EL display display unit; a voltage drop amount calculating circuit which calculates an amount of voltage drop generated in the power line on the other of the high-potential side and the low-potential side from video data which is data indicating luminance of each of the pixels and to estimate a potential at, at least one point of the power line; and a signal processing circuit which regulates at least an output potential on one of the high-potential side and the low-potential side to be supplied from the variable-voltage source such that a potential difference between the potential on one of the high-potential side and the low-potential side detected by the potential difference detecting circuit and the potential at the at least one point of the power line estimated by the voltage drop amount calculating circuit reaches a predetermined potential difference.

Accordingly, the display device according to this embodiment implements excellent power consumption reducing effect.

Hereinafter, the embodiment 1 of the present disclosure shall be specifically described with reference to the drawings.

FIG. 1 is a block diagram showing an outline configuration of the display device according to the embodiment 1 of the present disclosure.

A display device 100 shown in the figure includes an organic EL display unit 110, a data line driving circuit 120, a write scan driving circuit 130, a control circuit 140, a voltage drop amount calculating circuit 150, a memory 155, a signal processing circuit 160, a potential difference detecting circuit 170, a variable-voltage source 180, and a monitor wire 190.

Figure 2:
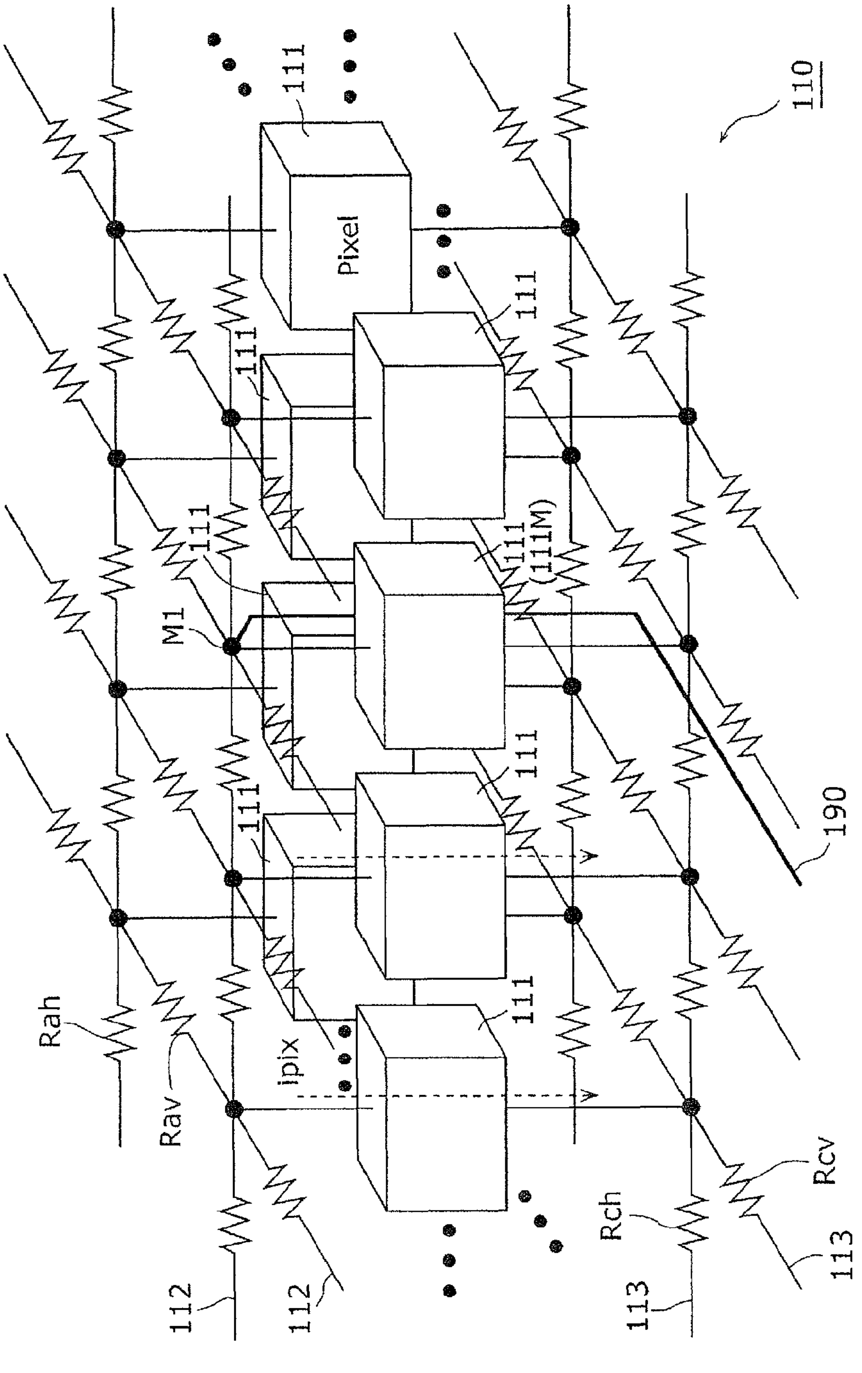
FIG. 2 is a perspective view schematically showing a configuration of an organic EL display unit according to the embodiment 1.

FIG. 2 is a perspective view schematically illustrating the configuration of the organic EL display unit 110 according to the embodiment 1. Note that the lower portion of the figure is the display screen side.

As shown in the figure, the organic EL display unit 110 includes pixels 111, a first power source wire 112, and a second power source wire 113.

Each pixel 111 is connected to the first power source wire 112 and the second power source wire 113, and emits light at a luminance that is in accordance with a pixel current ipix that flows to the pixel 111. At least one predetermined pixel out of the pixels 111 is connected to the monitor wire 190 at a detecting point M1. In the following description, a pixel directly connected to monitor wire 190 is referred to as a monitor pixel 111M. The monitor pixel 111M is provided, for example, near the center of the organic EL display unit 110.

The first power source wire 112 is arranged in a net-like manner to correspond to pixels 111 that are arranged in a matrix, and is electrically connected to the variable-voltage source 180 disposed at the peripheral part of the organic EL display unit 110. In the embodiment 1, the first power source wire 112 composes an anode side power source line network. On the other hand, the second power source wire 113 is formed in the form of a continuous film on the organic EL display unit 110, and is electrically connected to the variable-voltage source 180. In the embodiment 1, the second power source wire 113 composes a cathode-side power source line network. Through the output of a power source voltage from the variable-voltage source 180, a voltage corresponding to the power source voltage outputted from the variable-voltage source 180 is applied between the first power source wire 112 and the second power source wire 113. In FIG. 2, the first power source wire 112 and the second power source wire 113 are schematically illustrated in mesh-form in order to show the resistance components of the first power source wire 112 and the second power source wire 113. Note that, the second power supply wire 113 may be grounded to a common ground potential of the display device 100 at the peripheral part of the organic EL display unit 110, for example.

In the first power source wire 112, horizontal resistance component Rah and vertical resistance component Rav exist. In the second power source wire 113, horizontal resistance component Rch and vertical resistance component Rcv exist. Note that, although not illustrated, each of the pixels 111 is connected to the write scan driving circuit 130 and the data line driving circuit 120, and is also connected to a scanning line for controlling the timing at which the pixel emits light and stops emitting light, and to a data line for supplying signal voltage corresponding to the luminance of light emitted from the pixel 111.

The optimal position of the monitor pixel 111M is determined depending on the wiring method of the first power source wire 112 and the second power source wire 113, the values of the horizontal resistance component Rah and the vertical resistance component Rav in the first power source wire 112, and the values of the horizontal resistance component Rch and the vertical resistance component Rcv in the second power source wire 113.

Figure 3:
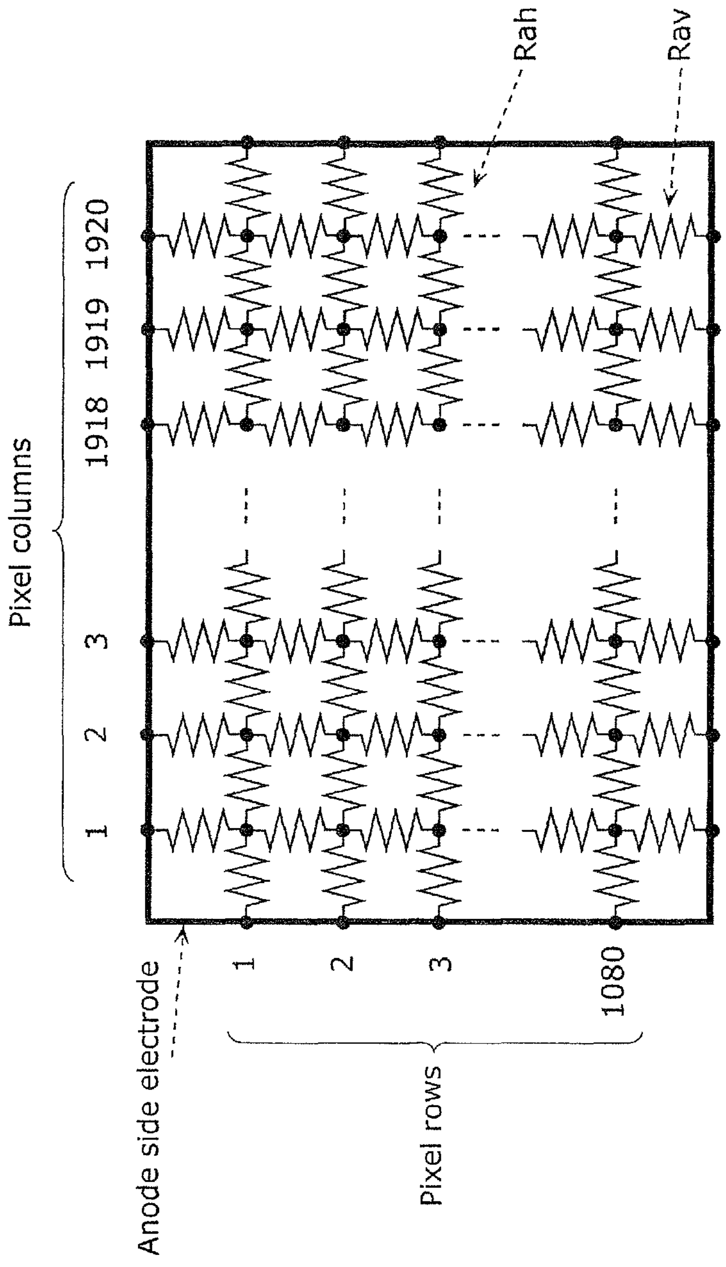
FIG. 3 is a diagram schematically illustrating a model of the anode-side power source wire network in an organic EL display unit having 1920 pixels horizontally and 1080 pixels vertically.

FIG. 3 is a diagram schematically illustrating a model of the anode-side power wire network in the organic EL display unit 110 having 1920 pixels horizontally and 1080 pixels vertically.

Each pixel is connected to neighboring pixels above, below, on lateral sides by the horizontal resistance component Rah and the vertical resistance component Ray, and the power source voltage output from the variable-voltage source 180 is applied on the peripheral part.

Figure 4:
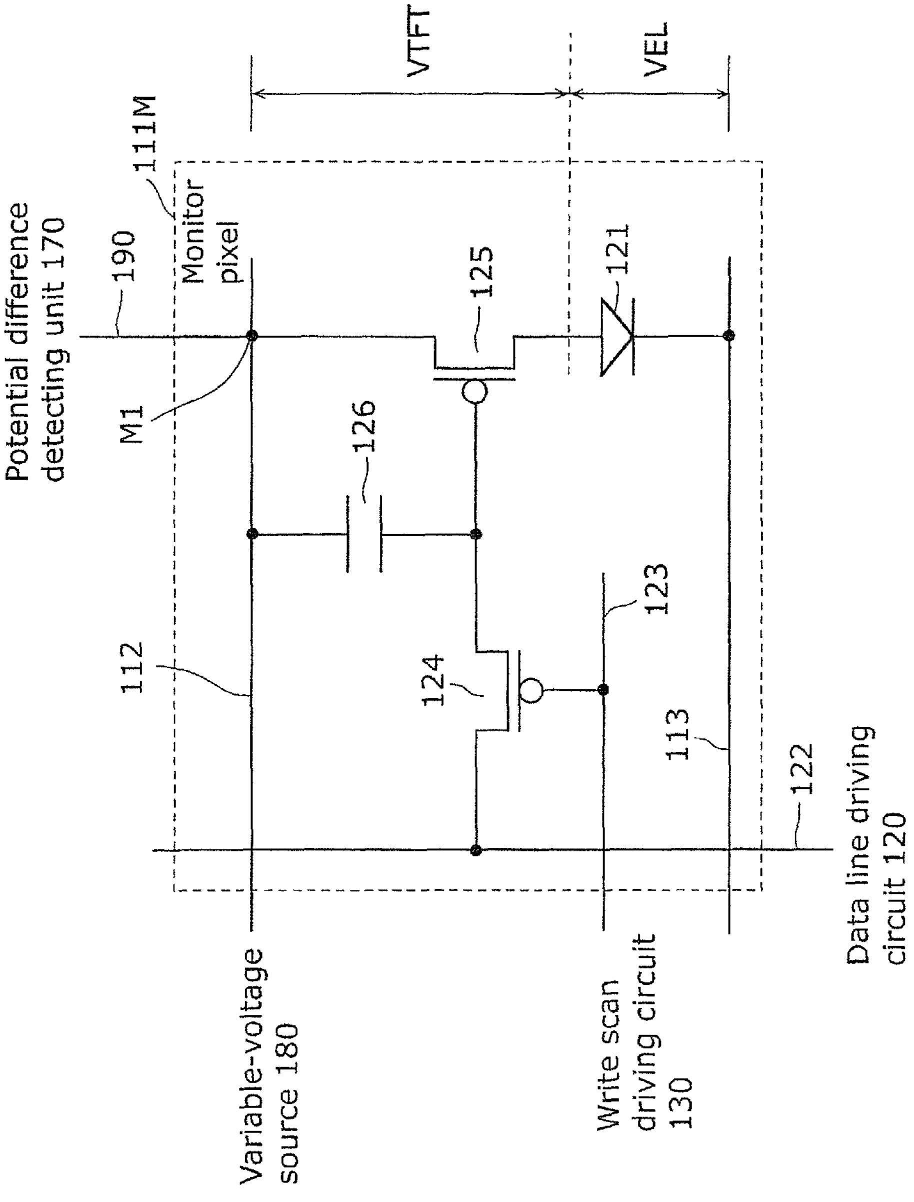
FIG. 4 is a circuit diagram illustrating an example of specific configuration of the pixel.

FIG. 4 is a circuit diagram illustrating an example of a specific configuration of the pixel 111.

The pixel 111 includes a driver and a light-emitting element. The driver includes a source electrode and a drain electrode. The light-emitting element includes a first electrode and a second electrode, and the first electrode is connected to one of the source electrode and the drain electrode of the driver. The high-side potential is applied to one of (i) the other of the source electrode and the drain electrode and (ii) the second electrode, and the low-side potential is applied to the other of (i) the other of the source electrode and the drain electrode and (ii) the second electrode. Specifically, each of the pixels 111 includes an organic EL element 121, a data line 122, a scanning line 123, a switch transistor 124, a driving transistor 125, and a capacitor 126. The monitor pixels 111 are, for example, arranged in a matrix in the organic EL display unit 110. In the monitor pixel 111M, the monitor wire 190 is connected to the other of the source electrode and the drain electrode of the driver. At least one pixel 111M is provided on the organic EL display unit 110.

The organic EL element 121 is an example of a light-emitting element having an anode electrode connected to the drain electrode of the driving transistor 125 and a cathode electrode connected to the second power source wire 113, and emits light with a luminance that is in accordance with the current value flowing between the anode and the cathode. The cathode-side electrode of the organic EL element 121 forms part of a common electrode provided in common to the pixels 111. The common electrode is electrically connected to the variable-voltage source 180 so that potential is applied to the common electrode from the peripheral part thereof. Specifically, the common electrode functions as the second power source wire 113 in the organic EL display unit 110. Furthermore, the cathode-side electrode is formed of a transparent conductive material made of a metallic oxide. Note that, the electrode on the anode side of the organic EL element 121 is an example of the first electrode, and the electrode on the cathode side of the organic EL element 121 is an example of the second electrode.

The data line 122 is connected to the data line driving circuit 120 and one of the source electrode and the drain electrode of the switch transistor 124, and signal voltage corresponding to video signal (video data) is applied to the data line 122 by the data line driving circuit 120.

The scanning line 123 is connected to the write scan driving circuit 130 and the gate electrode of the switch transistor 124, and switches between conduction and non-conduction of the switching transistor 124 according to the voltage applied by the write scan driving circuit 130.

The switching transistor 124 has one of a source electrode and a drain electrode connected to the data line 122, the other of the source electrode and the drain electrode connected to the gate electrode of the driving transistor 125 and one end of the capacitor 126, and is, for example, a p-type thin-film transistor (TFT).

The driving transistor 125 is a driver having a source electrode connected to first power source wire 112, a drain electrode connected to the anode electrode of the organic EL element 121, and a gate electrode connected to the one end of the capacitor 126 and the other of the source electrode and the drain electrode of the switching transistor 124, and is, for example, a p-type TFT. With this, the driving transistor 125 supplies the organic EL element 121 with current that is in accordance with the voltage held in the capacitor 126.

In the monitor pixel 111M, the source electrode of the driving transistor 125 is connected to the monitor wire 190. In the monitor pixel 111M, the cathode electrode of the organic EL element 121 is a cathode of the pixel 111M. The capacitor 126 has one end connected to the other of the source electrode and the drain electrode of the switch transistor 124, and the other end connected to the first power source wire 112, and holds the potential difference between the potential of the first power source wire 112 and the potential of the gate electrode of the driving transistor 125 when the switch transistor 124 becomes non-conductive. Specifically, the capacitor 126 holds a voltage corresponding to the signal voltage.

The following shall describe the function of the components illustrated in FIG. 1 with reference to FIGS. 2 to 4.

The data line driving circuit 120 outputs signal voltage corresponding to video data, to the pixels 111 via the data lines 122.

The write scan driving circuit 130 sequentially scans the pixels 111 by outputting a scanning signal to scanning lines 123. Specifically, the switch transistors 124 are switched between conduction and non-conduction per row. With this, the signal voltages outputted to the data lines 122 are applied to the pixels 111 in the row selected by the write scan driving circuit 130. Therefore, the pixels 111 emit light with a luminance that is in accordance with the video data.

The control circuit 140 instructs the drive timing to each of the data line driving circuit 120 and the write scan driving circuit 130.

The potential difference detecting circuit 170, which is the voltage detecting unit according to the present disclosure in this embodiment, measures the anode-side potential applied to the monitor pixel 111M. Specifically, the potential difference detecting circuit 170 measures, via the monitor wire 190, the anode-side potential applied to the monitor pixel 111M. Subsequently, the potential difference detecting circuit 170 measures the output voltage from the variable-voltage source 180, and measures the potential difference ΔV between the output voltage and the anode-side potential that is detected. More specifically, the potential difference ΔV is the amount of voltage drop on the anode side of the monitor pixel 111M. Subsequently, the potential difference detecting circuit 170 outputs the measured potential difference ΔV to the signal processing circuit 160.

The memory 155 is a storage unit in which the horizontal resistance component Rah and the vertical component Rav in the first power source wire 112 and the horizontal resistance component Rch and the vertical resistance component Rcv in the second power supply line 113, which are illustrated in FIGS. 2 and 3 are stored in advance.

The voltage drop amount calculating circuit 150 is an example of a voltage estimating unit, and estimates a distribution of voltage drop in the second power source wire 113 for each pixel 111, based on the video signal input to the display device 100, the horizontal resistance component Rch and the vertical resistance component Rcv in the second power source wire 113 read from the memory 155, and outputs the estimated distribution of voltage drop to the signal processing circuit 160.

In addition, the voltage drop amount calculating circuit 150 detects a peak value of the video data input to the display device 100, and outputs the peak signal indicating the detected peak value to the signal processing circuit 160. More specifically, the voltage drop amount calculating circuit 150 detects the data with highest gradation level among the video data as the peak value. High gradation level data corresponds to an image that is to be displayed brightly by the organic EL display unit 110.

The signal processing circuit 160 is a voltage regulating unit according to the present disclosure in the embodiment 1, and regulates the variable-voltage source 180 such that the potential difference between the potential on the anode side of the monitor pixel 111M and the potential on the cathode side of the predetermined pixel is the predetermined potential difference, using the distribution of the voltage drop on the cathode side output from the voltage drop amount calculating circuit 150, the peak signal, and the potential difference ΔV detected by the potential difference detecting circuit 170. More specifically, the signal processing circuit 160 determines the voltage required for the organic EL element 121 and the driving transistor 125 when the peak signal output from the voltage drop amount calculating circuit 150 is used to emit light from the pixel 111. The signal processing circuit 160 calculates a voltage margin based on the distribution of the amount of voltage drop estimated on the voltage drop amount calculating circuit 150 and the potential difference ΔV, which is the amount of voltage on the anode side detected by the potential difference detecting circuit 170. Subsequently, a sum of the voltage VEL required for the organic EL element 121 and the voltage VTFT required for the driving transistor 125, and the voltage margin Vdrop that are determined is calculated, and the result, that is, VEL+VTFT+Vdrop is output to the variable-voltage source 180 as the voltage of the first reference voltage Vref1.

In other words, the signal processing circuit 160 regulates the power source voltage which is the potential difference between the anode-side output potential and the cathode-side output potential, output by the variable-voltage source 180, according to the signal indicating the voltage margin Vdrop. More specifically, the signal processing circuit 160 controls the variable-voltage source 180 such that that power supply voltage increases as much as the voltage margin Vdrop.

Note that, the potential on the cathode side of the predetermined pixel may be a potential on the cathode side of the pixel having the largest amount of voltage drop in the distribution of the amount of voltage drop on the cathode side estimated by the voltage drop amount calculating circuit 150, or may alternatively be a potential on the cathode side of the pixel 111M estimated by the voltage drop amount distribution, for example.

In addition, the signal processing circuit 160 outputs the signal voltage corresponding to the video data input through the voltage drop amount calculating circuit 150 to the data line driving circuit 120.

The variable-voltage source 180 is a power supply unit in the embodiment 1, and outputs the potential on the high potential side and the potential on the low potential side to the organic EL display unit 110. The variable-voltage source 180 is a voltage-variable power source which outputs an output voltage Vout setting the potential difference between the potential on the anode side of the monitor pixel 111M detected by the potential difference detecting circuit 170 and the potential on the cathode side calculated based on the voltage drop amount distribution estimated by the voltage drop amount calculating circuit 150 to a predetermined potential difference (VEL+VTFT), using the first reference voltage Vref output by the signal processing circuit 160.

The monitor wire 190 is a high-potential side detecting line which has one end connected to the monitor pixel 111M and the other end connected to the potential difference detecting circuit 170, and transmits the high-side potential applied to the monitor pixel 111M to the potential difference detecting circuit 170.

Note that, in the embodiment 1, an example in which the potential on the anode side is measured and detected by the monitor pixel 111M, and the potential on the cathode side is estimated by the voltage distribution of the power source line network. However, the potential on the anode side may be calculated based on the estimation of the voltage drop amount distribution by the voltage drop amount calculating circuit 150, and the potential on the cathode side may be measured and detected by the monitor pixel 111M. More specifically, the monitor wire may be a low-potential side detecting line which has one end connected to the monitor pixel 111M and the other end connected to the potential difference detecting circuit 170, and transmits the low-side potential applied to the monitor pixel 111M to the potential difference detecting circuit 170.

Next, a detailed configuration of the variable-voltage source 180 shall be briefly described.

Figure 5:
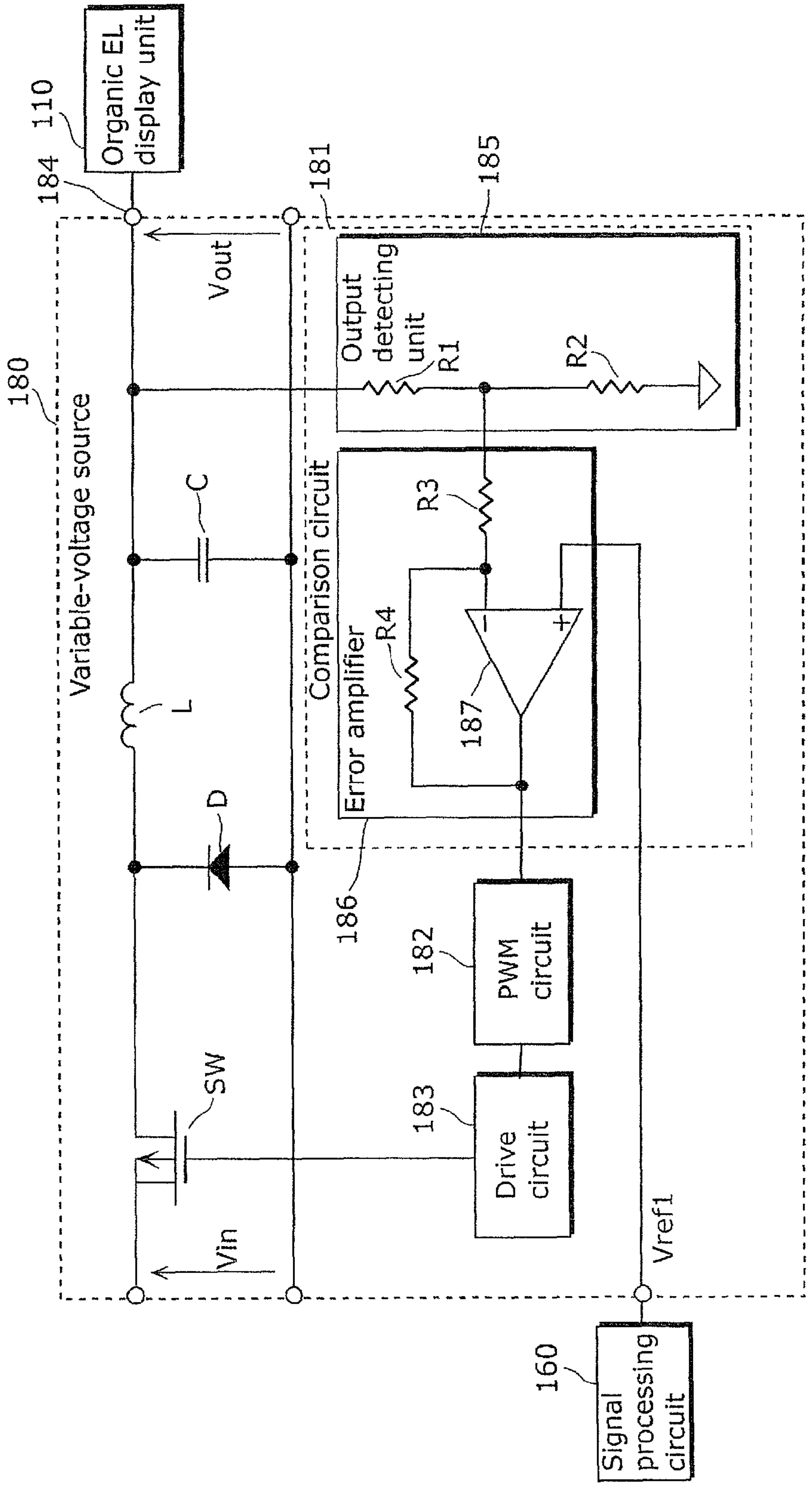
FIG. 5 is a block diagram illustrating an example of the specific configuration of the variable-voltage source.

FIG. 5 is a block diagram showing an example of a specific configuration of a variable-voltage source. Note that the organic EL display unit 110 and the signal processing circuit 160 which are connected to the variable-voltage source are also shown in the figure.

The variable-voltage source 180 shown in the figure includes a comparison circuit 181, a pulse width modulation (PWM) circuit 182, a drive circuit 183, a switch SW, a diode D, an inductor L, a capacitor C, and an output terminal 184, and converts an input voltage Vin into an output voltage Vout which is in accordance with the first reference voltage Vref1, and outputs the output voltage Vout from the output terminal 184. Note that, although not illustrated, an AC-DC converter is provided in a stage ahead of an input terminal to which the input voltage Vin is inputted, and it is assumed that conversion, for example, from 100 V AC to 20 V DC has already been carried out.

The comparison circuit 181 includes an output detecting unit 185 and an error amplifier 186, and outputs a voltage that is in accordance with the difference between the output voltage Vout and the first reference voltage Vref1, to the PWM circuit 182.

The output detecting unit 185, which includes two resistors R1 and R2 provided between the output terminal 184 and a grounding potential, divides the output voltage Vout in accordance with the resistance ratio between the resistors R1 and R2, and outputs the voltage-divided output voltage Vout to the error amplifier 186.

The error amplifier 186 compares the Vout that has been divided by the output detection unit 185 and the first reference voltage Vref1 outputted by the signal processing circuit 160, and outputs, to the PWM circuit 182, a voltage that is in accordance with the comparison result. Specifically, the error amplifier 186 includes an operational amplifier 187 and resistors R3 and R4. The operational amplifier 187 has an inverting input terminal connected to the output detecting unit 185 via the resistor R3, a non-inverting input terminal connected to the signal processing circuit 160, and an output terminal connected to the PWM circuit 182. Furthermore, the output terminal of the operational amplifier 187 is connected to the inverting input terminal via the resistor R4. With this, the error amplifier 186 outputs, to the PWM circuit 182, a voltage that is in accordance with the potential difference between the voltage inputted from the output detecting unit 185 and the first reference voltage Vref1 inputted from the signal processing circuit 160. Stated differently, the error amplifier 186 outputs, to the PWM circuit 182, a voltage that is in accordance with the potential difference between the output voltage Vout and the first reference voltage Vref1.

The PWM circuit 182 outputs, to the drive circuit 183, pulse waveforms having different duties depending on the voltage outputted by the comparison circuit 181. Specifically, the PWM circuit 182 outputs a pulse waveform having a long ON duty when the voltage outputted by the comparison circuit 181 is large, and outputs a pulse waveform having a short ON duty when the outputted voltage is small. Stated differently, the PWM circuit 182 outputs a pulse waveform having a long ON duty when the potential difference between the output voltage Vout and the first reference voltage Vref1 is large, and outputs a pulse waveform having a short ON duty when the potential difference between the output voltage Vout and the first reference voltage Vref1 is small. Note that the ON period of a pulse waveform is a period in which the pulse waveform is active.

The drive circuit 183 turns on the switch SW during the period in which the pulse waveform outputted by the PWM circuit 182 is active, and turns off the switch SW during the period in which the pulse waveform outputted by the PWM circuit 182 is inactive.

The switch SW is switched between conduction and non-conduction by the drive circuit 183. The input voltage Vin is outputted, as the output voltage Vout, to the output terminal 184 via the inductor L and the capacitor C only while the switch is the state of conduction. Accordingly, from 0V, the output voltage Vout gradually approaches 20 V (Vin). At this time the inductor L and the capacitor C are charged. Since voltage is applied (charged) to both ends of the inductor L, the output voltage Vout becomes a potential which is lower than the input voltage Vin by such voltage.

As the output voltage Vout approaches the first reference voltage Vref1, the voltage inputted to the PWM circuit 182 becomes smaller, and the on-duty of the pulse signal outputted by the PWM circuit 182 becomes shorter.

Then, the time in which the switch SW is turned on also becomes shorter, and the output voltage Vout gradually converges with the first reference voltage Vref1.

The potential of the output voltage Vout, while having slight voltage fluctuations, eventually settles to a potential in the vicinity of Vout=Vref1.

In this manner, the variable-voltage source 180 generates the output voltage Vout which becomes the first reference voltage Vref1 outputted by the signal processing circuit 160, and supplies the output voltage Vout to the organic EL display unit 110.

Next, the operation of the aforementioned display device 100 shall be described using FIGS. 6 to 13.

Figure 6:
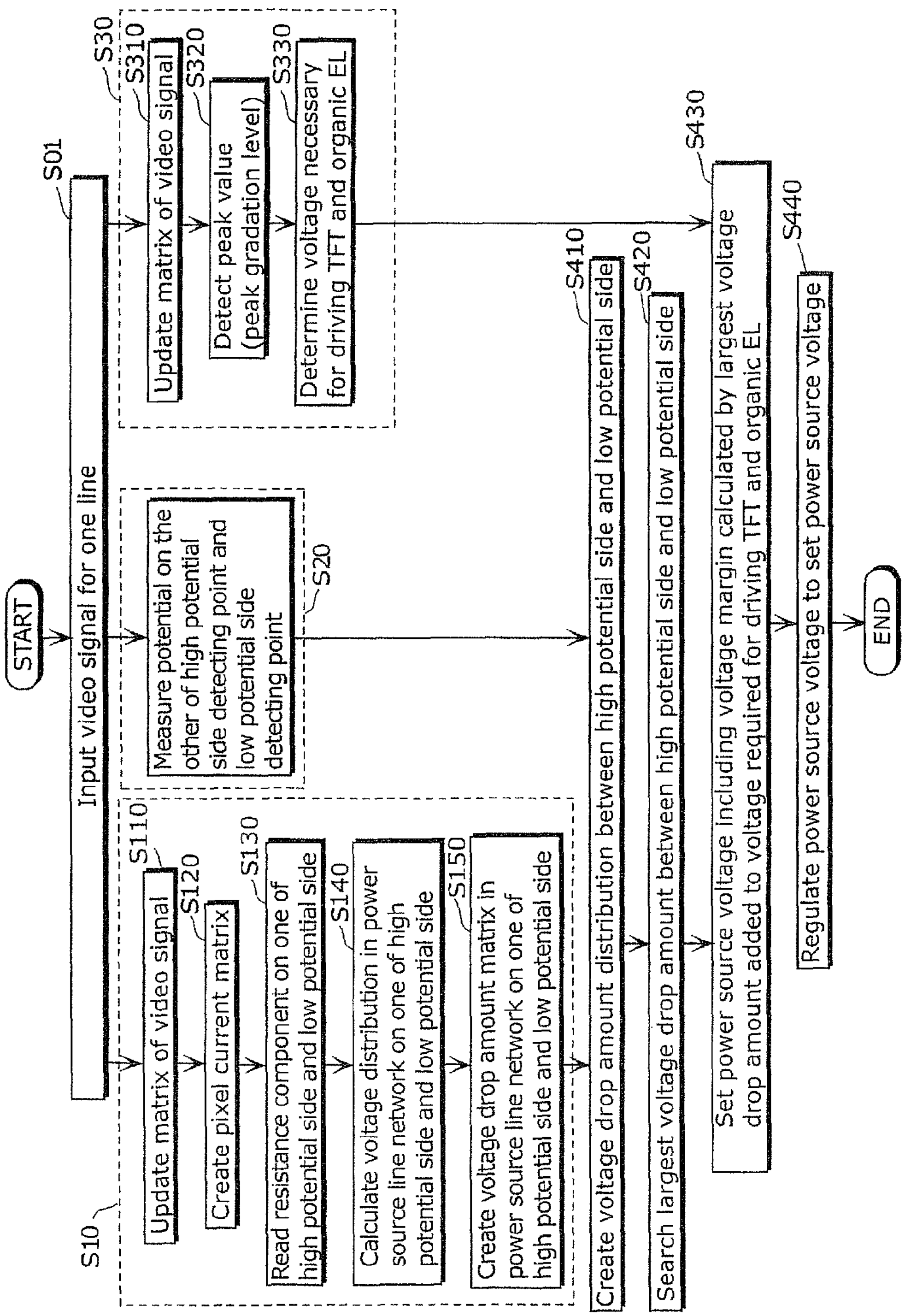
FIG. 6 is a flowchart showing an operation of a display device according to the embodiment 1 of the present disclosure.

FIG. 6 is a flowchart illustrating an operation of the display device 100 according to the embodiment 1 of the present disclosure.

In the operation for controlling the voltage of the power source line in the display device 100 includes estimating amount of voltage drop at the cathode by the voltage drop amount calculating circuit 150 (S10), measuring the amount of voltage drop on the anode by the potential difference detecting circuit 170 (S20), and calculating voltage required for driving pixel by the voltage drop amount calculating circuit 150 and the signal processing circuit 160 (S30) are concurrently performed in parallel. Subsequently, using the parameters obtained in the steps, the power source voltage is regulated by the signal processing circuit 160. The following shall describe the voltage control operation in the power source in the display device 100 shall be described in detail.

First, the voltage drop amount calculating circuit 150 updates the matrix of the video signal, and creates a voltage drop (increase) amount matrix for the second power source wire 113 (step S10). The details of step S10 shall be described later.

The potential difference detecting circuit 170 measures the potential on the anode side in the monitor pixel 111M, and detects the potential difference ΔV between the anode side potential and the output voltage from the variable-voltage source 180 (S20).

The voltage drop amount calculating circuit 150 updates the matrix of the video signal (S310), and detects a peak gradation level from the matrix of the updated vide signal (S320). The signal processing circuit 160 calculates the voltage (VTFT+VEL) required for the driving transistor and the organic EL element included in each pixel 111, based on the peak gradation level detected by the voltage drop amount calculating circuit 150 (S330). The series of operation from the step S310 to S330 corresponds to step S30.

Next, the signal processing circuit 160 creates a voltage drop amount matrix which is the total amount of voltage drop between the anode side and the cathode side from the voltage drop (increase) amount matrix in the second power supply wire 113 created in step S10 and the potential difference LV which is the amount of voltage drop on the anode side in the monitor pixel 111M measured in step S20 (S410).

Next, the signal processing circuit 160 searches the voltage drop amount matrix between the anode side and the cathode side created in step S410 for a largest amount of voltage drop between the anode side and the cathode side (S420).

Next, the signal processing circuit 160 calculates the voltage margin Vdrop from the largest amount of voltage drop between the anode side and the cathode side searched in step S420, and sets the reference voltage Vref1 to be set as the output voltage from the variable-voltage source 180 based on the voltage margin Vdrop, VTFT+VEL calculated in step S330 (S430).

Finally, the signal processing circuit 160 and the variable-voltage source 180 regulate the output voltage from the variable-voltage source 180 to be the reference voltage Vref1 set in step S430 (S440).

Here, the operations by the voltage drop amount calculating circuit 150 and the signal processing circuit 160 shall be described in detail focusing on the operation by step S10 described above.

Figure 7:
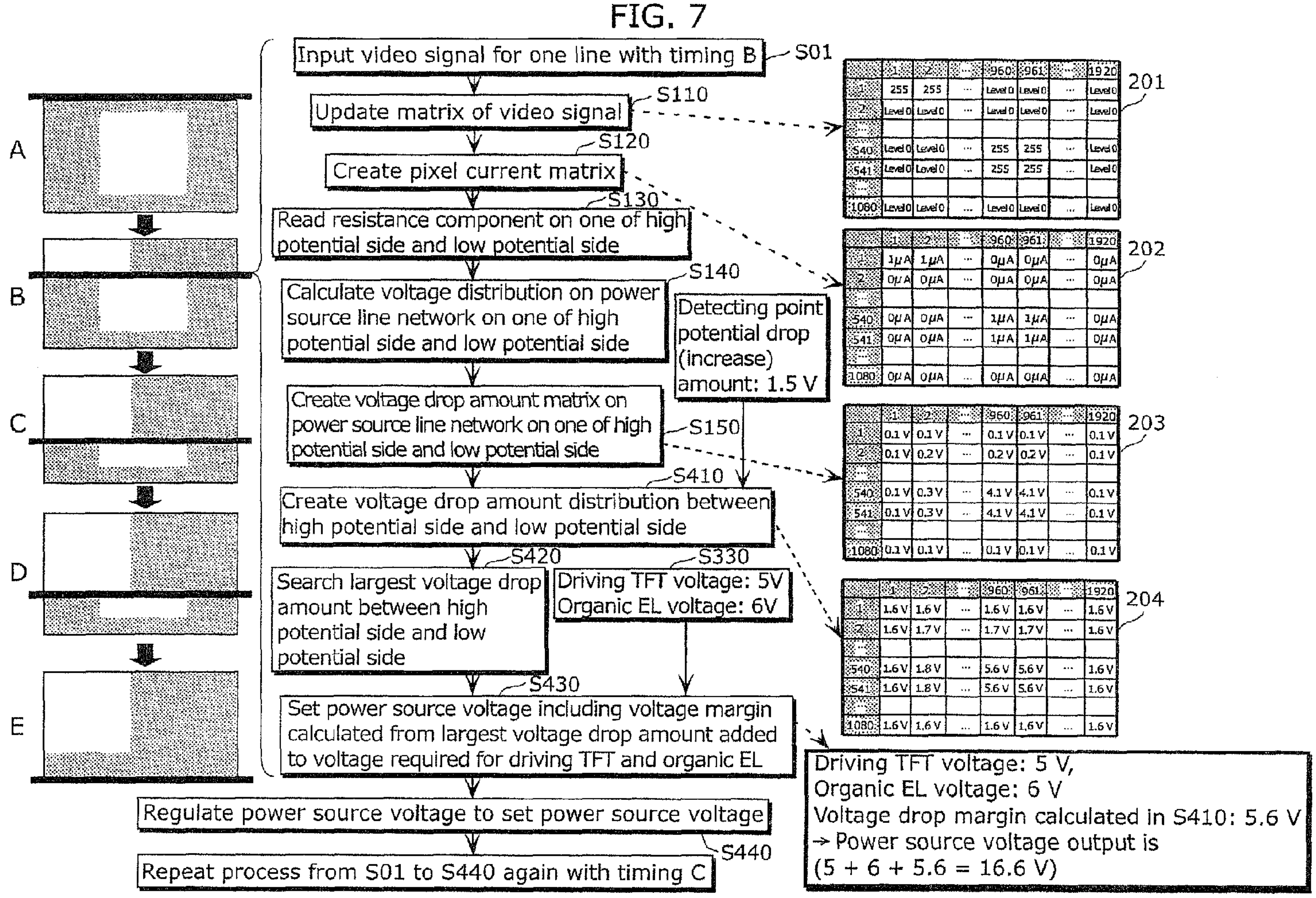
FIG. 7 is a flowchart illustrating an example of the operation by the voltage drop amount calculating circuit and the signal processing circuit included in the embodiment 1 of the present disclosure.

FIG. 7 is a flowchart illustrating an example of the operation by the voltage drop amount calculating circuit 150 and the signal processing circuit 160 included in the display device 100 according to the embodiment 1 of the present disclosure. The operational flowchart illustrated at the center of FIG. 7 is an excerpt of the operation in step S10 by the voltage drop amount calculating circuit 150 and the operation in step S410 to S440 by the signal processing circuit 160 among the operational flow of the display device 100 according to the present disclosure in FIG. 6. Furthermore, FIG. 7 is a diagram illustrating the voltage distribution in the power source line network is calculated not for each frame but for each pixel row in steps S140 and S150. A transition from the image A to the image E is illustrated on the left side of FIG. 7. To put it differently, a period from the image A to the image E corresponds to one frame period. The following shall describe the operation using calculation of voltage distribution in the power source line network in the image B as an example.

First, the voltage drop amount calculating circuit 150 inputs the video signal for one pixel row updated between the image A and the image B (S01).

Next, the voltage drop amount calculating circuit 150 updates the matrix of the video signal being held (S110). More specifically, in the video signal matrix data 201 illustrated on the right side of FIG. 7, gradation level data of the first pixel row is updated between the image A and the image B.

Next, the voltage drop amount calculating circuit 150 creates the pixel current matrix using the updated matrix of the video signal and the conversion formula to the pixel current or the conversion table to the pixel current. More specifically, in the pixel current matrix data 202 illustrated on the right side of FIG. 7, the pixel current data in the first pixel row is updated between the image A and the image B.

Next, the voltage drop amount calculating circuit 150 reads the horizontal resistance component Rch and the vertical resistance component Rcv in the second power source wire 113 from the memory 155 (step S130).

Next, the voltage drop amount calculating circuit 150 calculates the voltage distribution of the second power source wire 113 (step S140). More specifically, when the amount of voltage drop of the second power source wire 113 is vc(h, v), and the pixel current is i(h, v) in the second power source wire 113 in the pixel coordinates (h, v), the following equation 1 is derived with respect to the current i (h, v) in the pixel coordinates (h, v).

$$\mathrm{Rch}\times\{vc(h-1,v)-vc(h,v)\}+\mathrm{Rch}\times\{vc(h+1,v)-vc(h,v)\}+\mathrm{Rcv}\times\{vc(h,v-1)-vc(h,v)\}+\mathrm{Rcv}\times\{vc(h,v+1)-vc(h,v)\}=i(h,v) \quad \text{(Equation 1)}$$

However, h is an integer from 1 to 1920, and v is an integer from 1 to 1080. In addition, since vc (0, v) and vc (1921, v), vc (h, 0), vc (h, 1081) are the amount of voltage drop generated in the wire from the variable-voltage source 180 to the organic EL display unit 110 and are sufficiently small to be approximated by 0. In addition, as described above, Rch is the horizontal resistance component (admittance) of the second power source wire 113 and Rcv is the vertical resistance component (admittance) of the second power source wire 113.

1920×1080 first-order simultaneous equations for 1920×1080 unknown variables vc (h, v) are obtained by deriving the equation 1 for each pixel 111. Therefore, the voltage drop vc (h, v) in the voltage in the second power source wire 113 in each pixel can be obtained by solving the first-order simultaneous equations. More specifically, the voltage distribution on the second power source wire 113 can be calculated for each pixel 111.

Figure 8A:
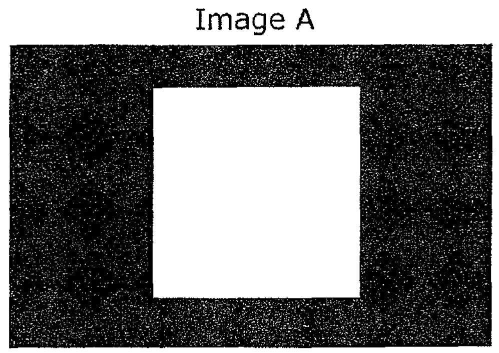
FIG. 8A is a diagram schematically illustrating an example of an image displayed on the organic EL display unit.

FIG. 8A is a diagram schematically illustrating an example of the image displayed on the organic EL display unit 110.

The image A illustrated in FIG. 8A is the image A illustrated in FIG. 7. In the image A, the central part of the organic EL display unit 110 is white, and the rest of the organic EL display unit 110 is black.

Figure 8B:
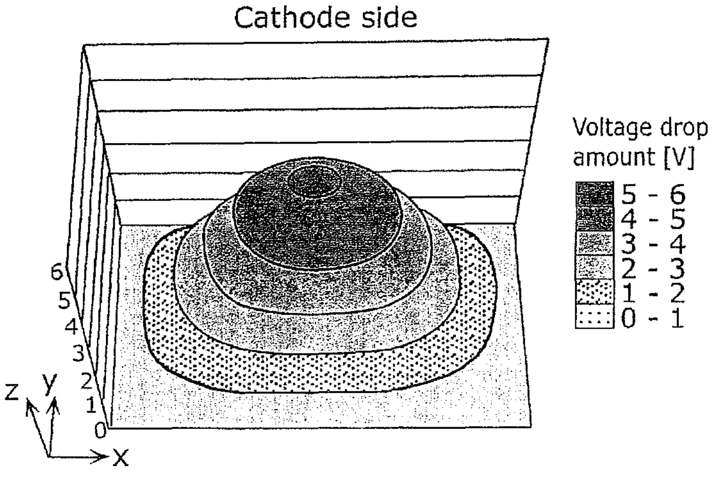
FIG. 8B is a graph illustrating a voltage distribution in a cathode-side power source line network calculated from video signals indicating the image in FIG. 8A.

FIG. 8B is a graph indicating voltage distribution of the second power source wire 113 calculated from the video signal indicating the image A. X axis in FIG. 8B indicates the pixel coordinate in column direction, y axis indicates the pixel coordinate in row direction, and z axis indicates the amount of voltage drop. More specifically, the pixel coordinates (0, v) corresponds to x axis, and the pixel coordinates (h, 0) corresponds to y axis.

The voltage drop amount calculating circuit 150 calculates the voltage drop (increase) amount in the second power source wire 113. Here, the second power source wire 113 is formed as a continuous film. Accordingly, the voltage drop (increase) amount vc (h, v) in the second power source wire 113 is its largest at the center of the organic EL display unit 110, that is at the pixel coordinates (960, 540).

Furthermore, the voltage drop amount calculating circuit 150 according to the embodiment 1 can not only calculate the voltage drop (increase) amount in the second power source wire 113, but also calculate the amount of voltage drop of the first power source wire 112. The following shall describe a case in which the amount of voltage drop in the first power source wire 112 is calculated for the image A as an example.

Figure 8C:
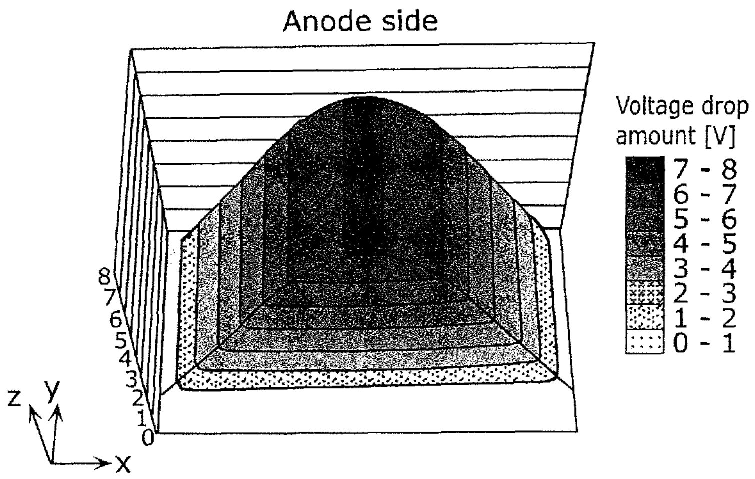
FIG. 8C is a graph illustrating a voltage distribution of the anode-side power source line network calculated from the video signals indicating the image in FIG. 8A.

FIG. 8C is a graph indicating voltage distribution of the first power source wire 112 calculated from the video signal indicating the image A. X axis in FIG. 8C indicates the pixel coordinate in column direction, y axis indicates the pixel coordinate in row direction, and z axis indicates the amount of voltage drop. More specifically, the pixel coordinates (0, v) corresponds to x axis, and the pixel coordinates (h, 0) corresponds to y axis. It is assumed that the first power source wire 112 is a one-dimensional wire having the vertical resistance component Rav illustrated in FIGS. 2 and 3 to be substantially infinite. In other words, the first power source wires 112 each provided corresponding to a row of pixels 111 are provided parallel to a horizontal direction (row direction). With this, the amount of voltage drop in the first power source wire 112 in a row corresponding to the white region in the image A gradually increases toward the center of the screen. In contrast, the amount of voltage drop in the first power source wire 112 other than the rows corresponding to the white region in the image A is substantially 0.

Note that, the process for calculating the voltage distribution of the second power source wire 113, or the process for calculating the voltage distribution of the first power source wire 112 (step S140) is an example of the estimation step.

The voltage distribution in the second power source wire 113 and the voltage distribution in the first power source wire 112 when the video signal different from the video signal indicating the image A is input to the display device 100 shall be described.

Figure 9A:
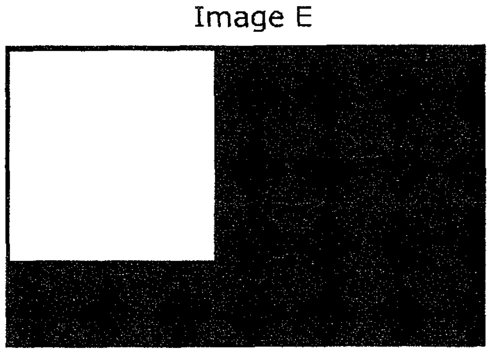
FIG. 9A is a diagram schematically illustrating another example of image displayed on the organic EL display unit.

FIG. 9A is a diagram schematically illustrating another example of an image displayed on the organic EL display unit. The image E illustrated in FIG. 9A is the image E in FIG. 7, and has a white region with the same size as the white region in the image A in FIG. 8A, and displayed on a different position from the white region in the image A. More specifically, in the image E, the white region includes the pixel coordinates (1, 1).

Figure 9B:
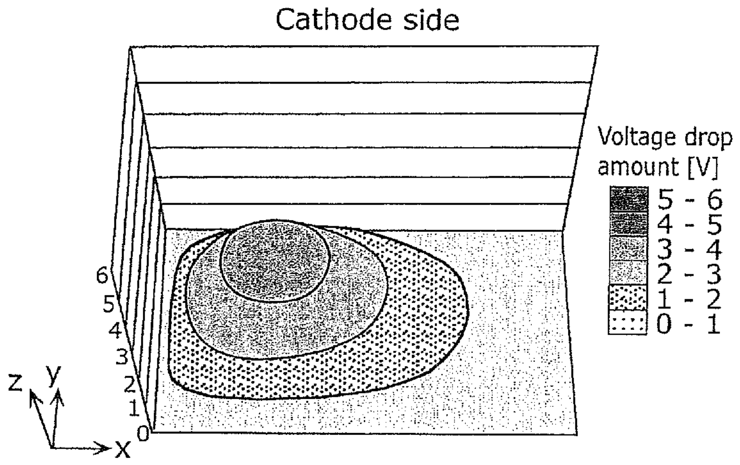
FIG. 9B is a graph illustrating a voltage distribution in a cathode-side power source line network calculated from video signals indicating the image in FIG. 9A.

FIG. 9B is a graph indicating voltage distribution of the second power source wire 113 calculated from the video signal indicating the image E. X axis in FIG. 9B indicates the pixel coordinate in column direction, y axis indicates the pixel coordinate in row direction, and z axis indicates the amount of voltage drop.

Compared to the voltage distribution of the second power source wire 113 illustrated in FIG. 8B, the voltage distribution in the second power source wire 113 illustrated in FIG. 9B has a distribution peak shifted to the left, and a lower peak voltage. More specifically, while the largest value of the voltage distribution in the second power source wire 113 illustrated in FIG. 8B is 5 to 6 V, the largest value of the voltage distribution in the second power source wire 113 is 3 to 4 V, that is, a reduction by approximately 2V.

To put is differently, the largest value of the voltage distribution in the second power source wire 113 have a different value depending on the image. More specifically, although the size of the white region is the same in the image A and E, the largest value of the voltage distribution in the second power source wire 113 is different since the white region is displayed on different positions.

Figure 9C:
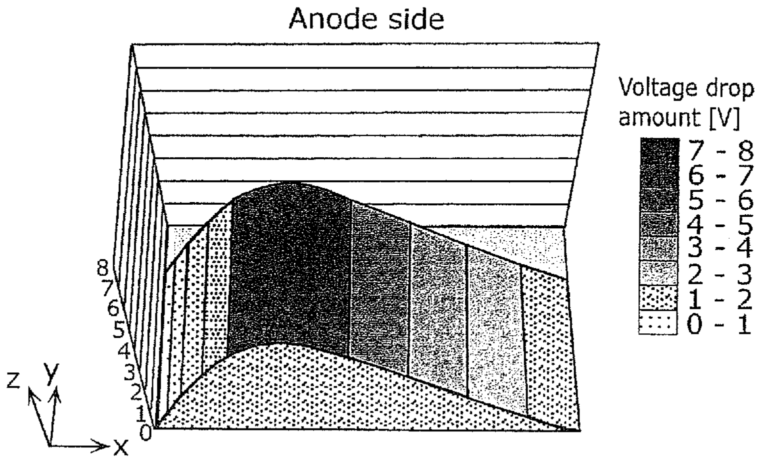
FIG. 9C is a graph illustrating a voltage distribution of the anode-side power source line network calculated from the video signals indicating in FIG. 9A.

FIG. 9C is a graph indicating voltage distribution of the first power source wire 112 calculated from the video signal indicating the image E. X axis in FIG. 9C indicates the pixel coordinate in column direction, y axis indicates the pixel coordinate in row direction, and z axis indicates the amount of voltage drop.

Compared to the voltage distribution of the first power source wire 112 illustrated in FIG. 8C, the voltage distribution in the first power source wire 112 illustrated in FIG. 9C has a distribution peak shifted to the left, and a lower peak voltage. More specifically, while the largest value of the voltage distribution in the first power source wire 112 illustrated in FIG. 8C is 7 to 8 V, the largest value of the voltage distribution in the first power source wire 112 in FIG. 9C is 4 to 5 V, showing a reduction by approximately 3V.

To put is differently, the largest value of the voltage distribution in the first power source wire 112 have a different value depending on the image. More specifically, although the size of the white region is the same in the image A and E, the largest value of the voltage distribution in the first power source wire 112 is different since the white region is displayed on different positions.

As described above, when the voltage drop amount distribution significantly changes depending on the image, it is necessary to provide multiple detecting wires in order to specify the monitor pixels and measure the actual amount of voltage drop. When multiple detecting lines are provided, layout and the number of detecting lines must be considered such that the detecting lines are not visible when the image is displayed on the display panel. In view of this perspective, the estimation method for the amount of voltage drop using the power source line network described above is used for the electrodes on the side indicating significant change in amount of voltage drop depending on the display image. Meanwhile, for the electrodes on the side in which the tendency of the amount of voltage drop does not change depending on display image but the absolute values of the amount of voltage drop significantly change, actually measuring the data by providing detecting lines allows achieving the effect of maximum reduction in power consumption.

The description continues with reference to the operational flowchart in FIG. 7 again.

Next, the voltage drop amount calculating circuit 150 creates the voltage drop amount matrix in the second power source wire 113 (S150). More specifically, the voltage distribution data 203 in the second power source wire 113 illustrated on the right side of FIG. 7 is created.

Next, the signal processing circuit 160 creates the voltage drop amount distribution between the anode side and the cathode side from the voltage drop amount matrix in the second power source wire 113 created in step S150 and the potential difference ΔV detected in step S20 (S410). More specifically, the voltage drop amount matrix data 204 between the cathode and the anode illustrated on the right side of FIG. 7 is created. For example, the voltage drop amount matrix data 204 is calculated by simply adding the potential difference ΔV (1.5 V) which is the amount of voltage drop on the anode side detected in step S20 to the amount of voltage drop on the cathode side in each pixel in the voltage distribution data 203 in the second power source wire 113.

Next, the signal processing circuit 160 determines the largest amount of voltage drop, based on the voltage drop amount matrix data 204. More specifically, in the voltage drop amount matrix data 204 illustrated on the right side of FIG. 7, the largest amount of voltage drop data is determined to be 5.6 V (540th row, 960th column).

Next, the voltage drop amount calculating circuit 150 sets the voltage calculated by adding the voltage margin calculated from the largest amount of voltage drop to the voltage required for driving the drive transistor and the organic EL element as a power source voltage. More specifically, when the required voltage for the drive transistor is 5 V, and the required voltage for the organic EL element is 6V, the power source voltage is set to be 16.6 V, calculated by adding the voltages and the largest amount of voltage drop 5.6V.

Finally, the signal processing circuit 160 and the variable-voltage source 180 regulate the output voltage from the variable-voltage source 180 to be the reference voltage Vref1 set in step S430 (S440). More specifically, the signal processing circuit 160 outputs 16.6 V to the variable-voltage source 180 as Vref1.

Using the process for controlling the power source voltage corresponding to the image B described above as one unit, the process is performed each time the video signal data for one pixel row is updated.

Note that, in FIG. 7, when the process for the image E is performed after the process for the image A is performed, instead of performing the process for each pixel row, this corresponds to the case in which the process is performed for one frame.

Alternatively, instead of performing the process for one pixel row, the process may be performed on multiple pixels rows as one unit.

The aspect in which the process is performed for one frame has an advantage of ensured process time for one process. On the other hand, the aspect in which the process is performed for each pixel row requires high-speed process but has an advantage of increased accuracy upon setting the power source voltage.

Next, step S30 in the operational flowchart illustrated in FIG. 6 shall be described in detail.

First, the voltage drop amount calculating circuit 150 obtains video signal data for one frame or a pixel row input to the display device 100, and updates the matrix of the video signal (step S310). For example, the voltage drop amount calculating circuit 150 has a buffer, and accumulates the video data for one frame period in that buffer.

Next, the voltage drop amount calculating circuit 150 detects the peak value of the obtained video data (step S320), and outputs a peak signal indicating the detected peak signal to the signal processing circuit 160. More specifically, the voltage drop amount calculating circuit 150 detects the peak value of the video data for each color. For example, for each of red (R), green (G), and blue (B), the video data is expressed using the 256 gradation levels from 0 to 255 (luminance being higher with a larger value). Here, when a part of the video data in the organic EL display unit 110 is R:G:B=177:124:135, another part of the video data in the organic EL display unit 110 is R:G:B=24:177:50, and another part of the video data is R:G:B=10:70:176, the voltage drop amount calculating circuit 150 detects 177 as the peak value of R, 177 as the peak value of G, and 176 as the peak value of B, and outputs the peak signals indicating the pixel values of the colors to the signal processing circuit 160.

Next, the signal processing circuit 160 determines a voltage VTFT required for the drive transistor 125 and a voltage VEL required for the organic EL element 121 for causing the organic EL element 121 to emit light with a peak value output from the voltage drop amount calculating circuit 150 (step S330). Specifically, the signal processing circuit 160 determines the VTFT+VEL corresponding to the gradation levels for each color, using a required voltage conversion table indicating the required voltage VTFT+VEL corresponding to the gradation levels for each color.

FIG. 10 is a chart illustrating an example of the required voltage conversion table referred by the signal processing circuit 160. As illustrated in FIG. 10, the required voltage VTFT+VEL corresponding to the gradation levels of the colors are stored in the required voltage conversion table. For example, the required voltage corresponding to the peak value 177 of R is 8.5 V, the required voltage corresponding to the peak value 177 of G is 9.9 V, and the required voltage corresponding to the peak value 176 of B is 6.7 V. Among the required voltages corresponding to the peak values of the respective colors, the largest voltage is 9.9 V corresponding to the peak value of G. Therefore, the signal processing circuit 160 determines VTFT+VEL to be 9.9 V.

Next, steps S430 and S440 in the operational flowcharts illustrated in FIGS. 6 and 7 shall be described in detail.

First, the signal processing circuit 160 determines the voltage margin Vdrop from the potential difference ΔV corresponding to the voltage drop on the anode side detected by the potential difference detecting circuit 170 and the voltage drop (increase) amount on the cathode side calculated by the voltage drop amount calculating circuit 150. More specifically, the signal processing circuit 160 includes a voltage margin conversion table indicating the voltage margin Vdrop corresponding to the potential difference between the potential difference ΔV and the potential on the cathode side calculated by the voltage drop amount calculating circuit 150, and determines the voltage margin Vdrop with reference to the conversion table.

FIG. 11 is a chart illustrating an example of the voltage margin conversion table included in the signal processing circuit 160. As illustrated in FIG. 11, in the voltage margin conversion table, the voltage margin Vdrop corresponding to the potential difference value which is a sum of the potential difference ΔV and the calculated voltage drop (increase) amount on the cathode side is stored. For example, when the potential difference value is 3.4 V, the voltage margin Vdrop is 3.4 V. Therefore, the signal processing circuit 160 determines the voltage drop margin Vdrop to be 3.4 V.

As shown in the voltage margin conversion table, the relationship between the potential difference value and the voltage margin Vdrop is an increasing function. Furthermore, the output voltage Vout of the variable-voltage source 180 rises with a bigger voltage drop margin Vdrop. In other words, the relationship between the potential difference value and the output voltage Vout is an increasing function.

Next, the signal processing circuit 160 determines the output voltage Vout to be output by the variable-voltage source 180 in the next frame period. More specifically, the output voltage Vout to be output by the variable-voltage source 180 in the next frame period is set to be VTFT+VEL+Vdrop which is a sum of VTFT+VEL which is the voltage required for the organic EL element 121 and the drive transistor 125 and the voltage margin Vdrop corresponding to the potential difference value (S430).

Finally, the signal processing circuit 160 regulates the variable-voltage source 180 by setting the first reference voltage Vref1 as VTFT+TEL+Vdrop at the beginning of the next frame period. With this, in the next frame period, the variable-voltage source 180 supplies Vout=VTFT+VEL+Vdrop to the organic EL display unit 110 (S440).

As described above, the display device 100 according to the embodiment 1 includes the variable-voltage source 180, the potential difference detecting circuit 170, the voltage drop amount calculating circuit 150, and the signal processing circuit 160. The variable-voltage source 180 outputs the potential difference between the potential on the positive electrode side and the potential on the negative electrode side as the power source voltage. The potential difference detecting circuit 170 detects the amount of voltage drop on the anode side by measuring the anode side potential applied to the monitor pixel 111M and the output voltage Vout from the variable-voltage source 180. The voltage drop amount calculating circuit 150 calculates the amount of voltage drop generated on the power source line on the cathode side from the video data and estimates the amount of voltage drop in at least one point of the power source line. The signal processing circuit 160 regulates the variable-voltage source 180 such that the voltage applied to the monitor pixel 111M is the predetermined voltage (VTFT+VEL) by the detected amount of voltage drop on the anode side and the calculated amount of voltage drop on the cathode side.

With this, the display device 100 detects and calculates the voltage drop by the horizontal resistance component Rah and the vertical resistance component Rav in the first power source wire 112 and the voltage increase by the horizontal resistance component Rch and the vertical resistance component Rcv in the second power source wire 113, and feeds the voltage drop and the voltage increase back to the variable-voltage source 180. With this, excess in the supply voltage can be reduced, reducing the power consumption.

Furthermore, in the display device 100 according to the embodiment 1, the number of the detecting lines can be reduced, and the design change in the layout of the display panel can be simplified, compared to a case in which both of the high-potential side potential and the low-potential side potential applied on the pixel are detected by providing the detecting lines are detected.

In addition, in the display device 100 according to the embodiment 1, the actual data is measured by the detecting lines on one side of the electrodes, compared to a case in which both of the high-potential side potential and the low-potential side potential applied to the pixels are estimated by the power source line network model. Accordingly, more highly accurate power source voltage can be set.

Furthermore, by reducing the power consumption, the heat generated by the organic EL element 121 is suppressed, thereby preventing the degradation of the organic EL element 121.

Next, in the display device 100 described above, the transition of the display pattern when the input video data changes at or before the Nth frame and the n+1th frame and onward shall be described with reference to FIGS. 12 and 13.

First, the video data that is assumed to have been inputted in the Nth frame and the N+1th frame shall be described.

First, it is assumed that, up to the Nth frame, the video data corresponding to the central part of the organic EL display unit 110 is a peak gradation level (R:G:B=255:255:255) in which the central part of the organic EL display unit 110 is seen as being white. On the other hand, it is assumed that the video data corresponding to a part of the organic EL display unit 110 other than the central part is a gray gradation level (R:G:B=50:50:50) in which the part of the organic EL display unit 110 other than the central part is seen as being gray.

Furthermore, from the N+1th frame onward, it is assumed that the video data corresponding to the central part of the organic EL display unit 110 is the peak gradation level (R:G:B=255:255:255) as in the Nth frame. On the other hand, it is assumed that the video data corresponding to the part of the organic EL display unit 110 other than the central part is a gray gradation level (R:G:B=150:150:150) that can be seen as a brighter gray than in the Nth frame.

Next, the operation of the display device 100 in the case where video data as described above is inputted in the Nth frame and the N+1th frame shall be described.

Figure 12:
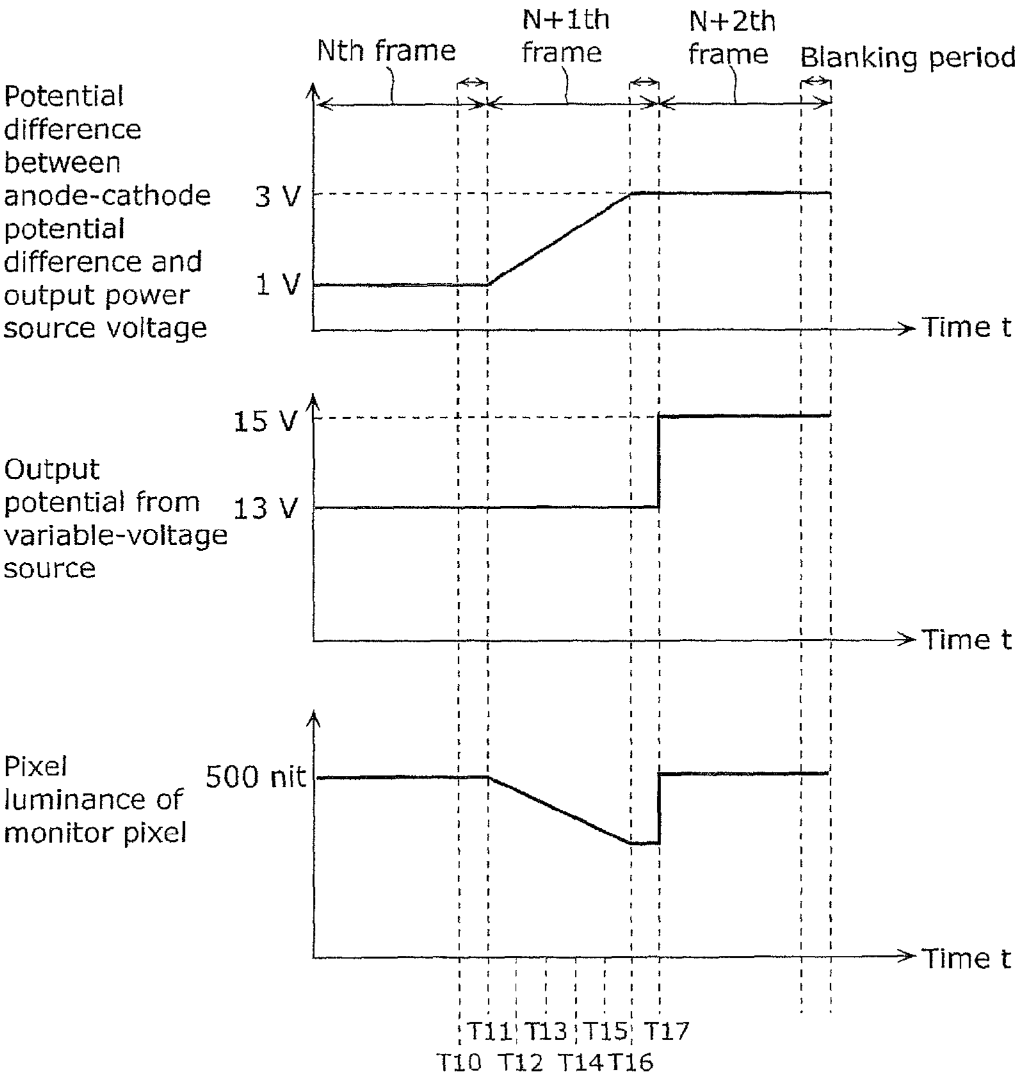
FIG. 12 is a timing chart illustrating an operation of the display device from Nth frame to N+2th frame.

FIG. 12 is a timing chart showing the operation of the display device 100 from the Nth frame to the N+2th frame.

The potential difference between the anode side and the cathode side, and the potential difference from the power source voltage output by the variable-voltage source 180, the output voltage Vout from the variable-voltage source 180, and the pixel luminance of the monitor pixel 111M are shown in the figure. Furthermore, a blanking period is provided at the end of each frame period.

Figure 13:
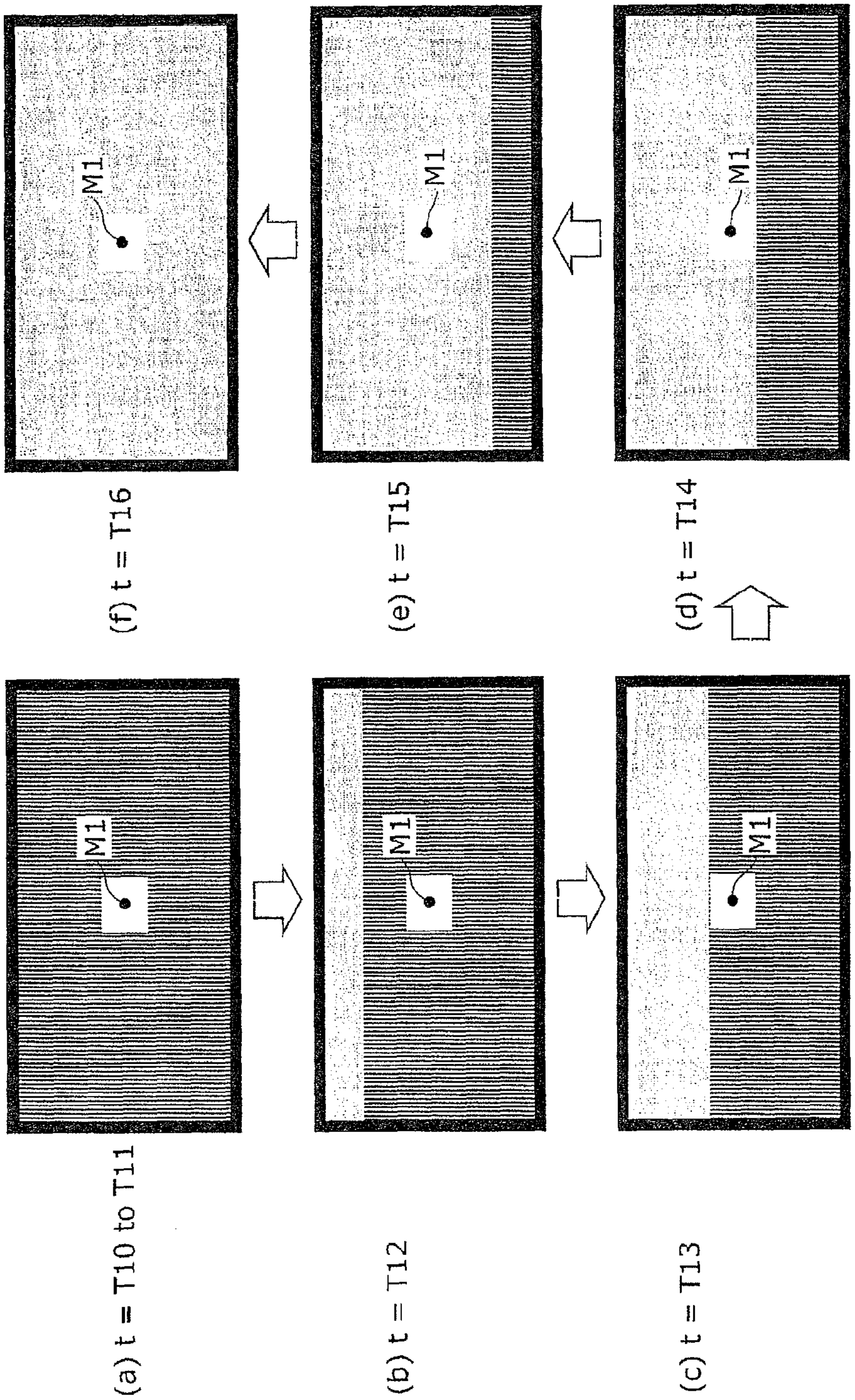
FIG. 13 is a diagram schematically illustrating images displayed on the organic EL display unit.

FIG. 13 is diagram schematically showing images displayed on the organic EL display unit.

In a time t=T10, the signal processing circuit 150 detects the peak value of the video data of the Nth frame. The signal processing circuit 160 determines VTFT+VEL from the peak value detected by the voltage drop amount calculating circuit 150. Here, since the peak value of the video data of the Nth frame is R:G:B=255:255:255, the signal processing circuit 160 uses the required voltage conversion table and determines the required voltage VTFT+VEL for the N+1th frame to be, for example, 12.2 V.

Meanwhile, the potential difference detecting circuit 170 detects the anode-side potential at the detecting point M1 via the monitor wire 190, and detects the potential difference ΔV which is the difference between the aforementioned potential and the output voltage Vout outputted from the variable-voltage source 180. For example, in the time t=T10, based on the potential difference between the potential difference ΔV and the cathode-side potential calculated by the voltage drop amount calculating circuit 150, the voltage drop margin Vdrop in the N+1th frame is determined to be 1 V, using the voltage margin conversion table.

A time t=T10 to T11 is the blanking period of the Nth frame. In this period, an image which is the same as that in the time t=T10 is displayed in the organic EL display unit 110.

(a) in FIG. 13 schematically shows an image displayed on the organic EL display unit 110 in time t=T10 to T11. In this period, the image displayed on the organic EL display unit 110 corresponds to the image data of the Nth frame, and thus the central part is white and the part other than the central part is gray.

In time t=T11, the signal processing circuit 160 sets the voltage of the first reference voltage Vref1 as the sum of VTFT+VEL+Vdrop (for example, 13.2 V) of the determined required voltage VTFT+VEL and the voltage drop margin Vdrop.

Over a time t=T11 to T16, the image corresponding to the video data of the N+1th frame is sequentially displayed on the organic EL display unit 110 ((b) to (f) in FIG. 13). At this time, the output voltage Vout from the variable-voltage source 180 is, at all times, the VTFT+VEL+Vdrop set to the voltage of the first reference voltage Vref1 in time t=T11. However, the video data corresponding to the part of the organic EL display unit 110 other than the central part is a gray gradation level that can be seen as a gray that is brighter than that in the Nth frame. Therefore, the amount of current supplied by the variable-voltage source 180 to the organic EL display unit 110 gradually increases over a time t=T11 to T16, and the voltage drop in the first power source wire 112 and the voltage rise in the second power source wire 113 gradually increase following this increase in the amount of current. With this, there is a shortage of power source voltage for the pixels 111 in the central part of the organic EL display unit 110, which are the pixels 111 in a brightly displayed region. Stated differently, luminance drops below the image corresponding to the video data R:G:B=255:255:255 of the N+1th frame. Specifically, over the time t=T11 to T16, the luminance of light emitted from the pixels 111 at the central part of the organic EL display unit 110 gradually drops.

In a time t=T16, the voltage drop amount calculating circuit 150 detects the peak value of the video data of the N+1th frame. Here, since the detected peak value of the video data of the N+1th frame is R:G:B=255:255:255, the signal processing circuit 160 determines the required voltage VTFT+VEL for the N+2th frame to be, for example, 12.2 V.

Meanwhile, the potential difference detecting circuit 170 detects the anode-side potential at the detecting point M1 via the monitor wire 190, and detects the potential difference ΔV which is the difference between the aforementioned potential and the output voltage Vout outputted from the variable-voltage source 180. For example, in the time t=T16, based on the potential difference between the potential difference ΔV and the cathode-side potential calculated by the voltage drop amount calculating circuit 150, the voltage drop margin Vdrop in the N+1th frame is determined to be 3 V, using the voltage margin conversion table.

In time t=T17, the signal processing circuit 160 sets the voltage of the first reference voltage Vref1 as the sum VTFT+VEL+Vdrop (for example, 15.2 V) of the determined required voltage VTFT+VEL and the voltage drop margin Vdrop. Therefore, from the time t=17 onward, the potential difference between the anode side and the cathode side of the monitor pixel 111M is VTFT+VEL which is the predetermined potential.

In this manner, in the display device 100, although luminance temporarily drops in the N+1th frame, this is a very short period and thus has practically no impact on the user.

Note that, in the display device 100 according to the embodiment 1, the reference voltage Vref1 to be input to the variable-voltage source 180 not only changes depending on the anode-side potential detected by the potential difference detecting circuit 170 and the cathode-side potential estimated by the voltage drop amount calculating circuit 150, but also changes depending on the peak signal detected for each frame from the input video data. However, in the display device according to the present disclosure, it is not essential to set VEL+VTFT which is the component of the reference voltage Vref1 to a voltage required for the light-emission of the peak signal detected for each frame from the video data, and may always be a voltage required for emitting the light of the highest gradation level (for example, level 255), regardless of the video data. More specifically, the voltage drop amount calculating circuit 150 does not always have to detect the peak value of the video data input to the display device 100. The voltage drop amount calculating circuit 150 may always output data of the highest gradation level (for example, the data of the level 255) to the signal processing circuit 160.

Note that, in the display device 100 according to the embodiment 1, it is preferable to adjust the voltage margin in response to the change in temperature. More specifically, a temperature sensor is provided in the organic EL display unit 110, and the voltage drop amount calculating circuit 150 updates the video signal-pixel current conversion table (or conversion formula) according to the monitored value (measured temperatures) of the temperature sensor, for example. The following shall describe the display device in consideration of the change in temperature. First, in the display device 100 according to the embodiment 1, a problem possible to a case of temperature change shall be described. When the temperature of the organic EL display unit 110 changes, the mobility and the threshold voltage of the drive transistor 125 changes, and the resistance of the organic EL element 121 changes as well. For example, when the temperature increases, the mobility of the drive transistor 125 increases and the current is more likely to flow in the drive transistor 125. In addition, the resistance in the organic EL element 121 is reduced as well, and the current is more likely to flow in the organic EL element 121. With this, the voltage drop amount calculating circuit 150 is affected by the temperature when converting the video signal into the pixel current, causing an error. For example, when the temperature of the organic EL display unit 110 is 25° C., the video signal of level 128 is converted to a pixel current of 1 μA. When the temperature is 60° C., the actual flow of the pixel current for level 128 is the 1.2 μA.

If the flow transitions to the following voltage drop amount calculating flow without taking the change in the pixel current by the temperature into consideration, despite the fact that the current equal to or higher than the estimation (approximately 1.2 times higher) flows, the pixel current value for 25° C. is calculated in the pixel current calculating flow by the voltage drop amount calculating circuit 150. With this, the amount of voltage drop calculated by the voltage drop amount calculating circuit 150 is lower than the actual value (for example, although the actual voltage drop is 2.4 V, the voltage drop is calculated to be 2.0 V due to the increase in temperature in the calculation flow). Here, if the voltage margin that is initially set is 5 V, the amount of voltage drop is calculated as 2 V in the calculating flow of the amount of voltage drop. Thus, the display device makes an adjustment to reduce the power source voltage for 3 V (5 V−2 V). However, the actual voltage drop is 2.4 V, and thus reducing the power source voltage by 3 V sets the power source voltage lower by 0.4 V. Consequently, the power source voltage enters the linear region of the drive transistor, causing a display error. The display device according to the present disclosure has a configuration in consideration of the change in temperature in order to solve the problem, and is capable of performing an operation for compensating the change in temperature. The following shall describe the operation of the display device having the temperature sensor.

Figure 14:
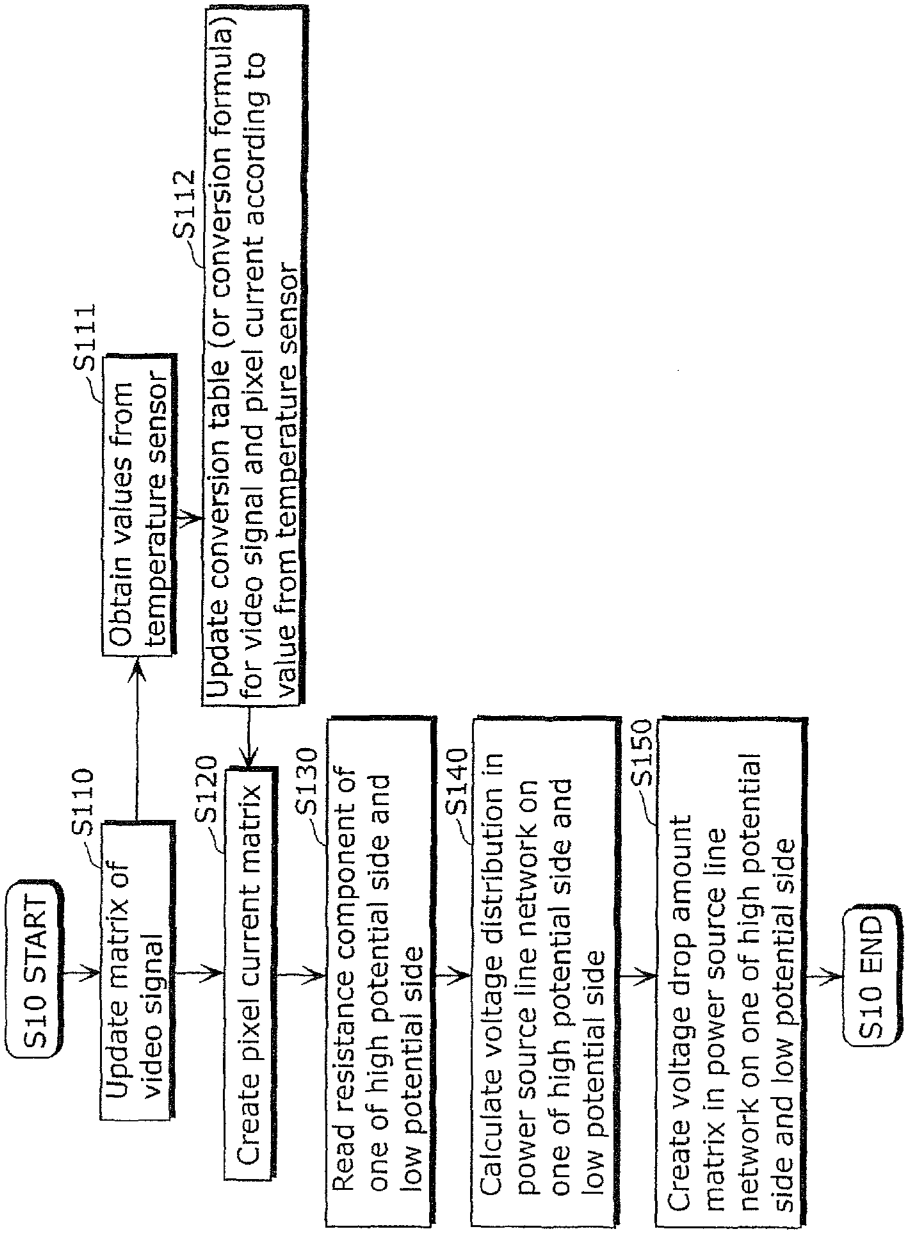
FIG. 14 is a flowchart showing an operation of a display device according to the variation 1 of the embodiment 1 of the present disclosure.

FIG. 14 is a flowchart indicating the operation of the display device according to the variation 1 of the embodiment 1 of the present disclosure. The flowchart according to the variation 1 of the embodiment 1 in FIG. 14 is different from step S10 in FIG. 6 only in that steps S111 and S112 are added. In the following description, the overlap with the step S10 in FIG. 6 shall be omitted, and only the difference shall be described.

First, the voltage drop amount calculating circuit 150 inputs the video signal updated for each frame or each pixel row.

Next, the voltage drop amount calculating circuit 150 updates the matrix of the video signal being held (S110).

Next, the voltage drop amount calculating circuit 150 obtains the measured temperature data by the temperature sensor included in the display device 100 (step S111).

Next, the voltage drop amount calculating circuit 150 updates the video signal-pixel circuit conversion table (conversion formula) according to the obtained measured temperature data (step S112). More specifically, the voltage drop amount calculating circuit 150 changes the conversion table (or the conversion formula) into a conversion table (or a conversion formula) in consideration with the mobility of the drive transistor 125, the threshold voltage, and the resistance of the organic EL element 121 at the measured temperature.

Next, the voltage drop amount calculating circuit 150 creates the pixel current matrix using the updated matrix of the video signal and the conversion table or the conversion formula for the pixel current (step S120).

With the operational flow described above, the display device according to the variation 1 of the embodiment 1 of the present disclosure allows setting a highly precise voltage margin unaffected by the change in temperature.

The display device according to the embodiment 1 according to the present disclosure performs creating the video signal matrix, the pixel current matrix, voltage distribution of the power source wire network, and the voltage drop amount matrix, setting the voltage margin, and regulating the power source voltage in the variable-voltage source according to the operational flowchart illustrated in FIGS. 6 and 7. However, the operational flow from creating the pixel current matrix to creating the voltage drop amount matrix may be repeated for multiple times in order to increase the accuracy of the voltage margin setting.

Figure 15:
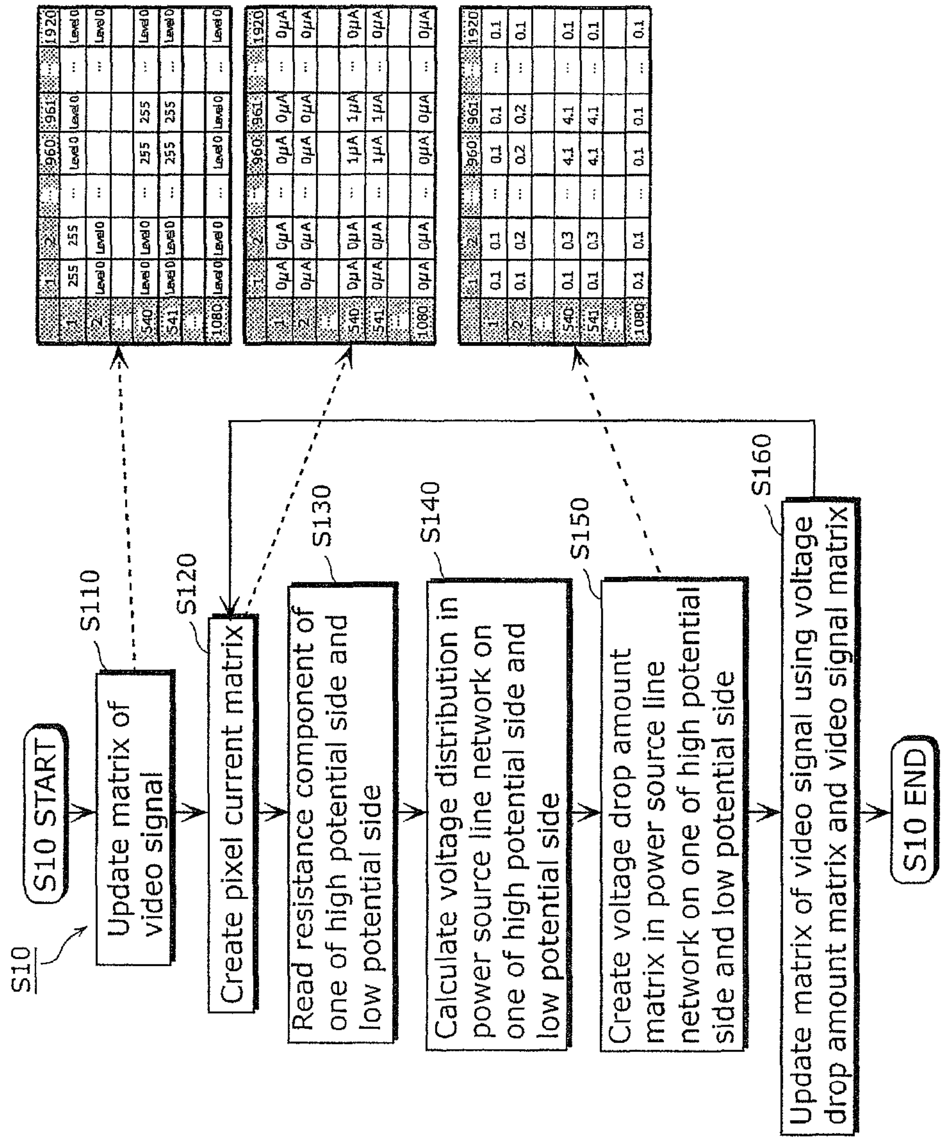
FIG. 15 is a flowchart showing an operation of a display device according to the variation 2 of the embodiment 1 of the present disclosure.

FIG. 15 is a flowchart indicating the operation of the display device according to the variation 2 of the embodiment 1 of the present disclosure. The flowchart according to the variation 2 of the embodiment 1 in FIG. 15 differs from step S10 in FIG. 6 in that step S160 is added and the operational flow from creating the pixel current matrix to updating the video signal matrix is repeated multiple times. In the following description, the overlap with the flowchart in FIG. 6 is omitted, and the description shall be made on the difference only.

The operation performed in each step is identical to the operation illustrated in FIG. 6. However, after the voltage drop amount matrix is created in step S150, the video signal matrix is updated from the voltage drop amount matrix using the predetermined conversion formula (or the conversion table) (step S160).

Subsequently, the updated video signal matrix is returned to step S10, and the pixel current matrix is created again using the updated video signal matrix.

There is a case in which a voltage drop amount excessive to the actual pixel current flowing in the pixel is set as the largest voltage drop amount calculated by converting the input video signal into the pixel current. In response to this problem, the video signal matrix may be converted and updated by weighting the largest voltage drop amount that is set before, and resetting the voltage drop amount by the updated video signal matrix multiple times converge the voltage drop amount to be calculated to a constant value. This operation increases the accuracy of the calculating of the voltage drop amount. The following shall describe an example of the operational flow.

First, it is assumed that level 255 is input as the gradation level data of the predetermined pixel. Here, it is assumed that the data voltage corresponding to level 255 is calculated as 4.5 V by the conversion formula used in step S110. Meanwhile, it is assumed that the largest voltage drop amount is calculated as 4.1 V by the operational flow from step S110 to step S150. In this case, in step S160, the predetermined conversion formula is defined as Data voltage after conversion=data voltage−(largest voltage drop amount×0.1)

In this case, the data voltage after conversion is calculated as 4.09 V (=4.5 V−4.1 V×0.1). The gradation level corresponding to the data voltage after conversion is level 214. Thus, the gradation level data in the predetermined pixel in the video signal matrix is updated to level 214, and the operation from step S120 to step S160 is performed again. More highly accurate largest voltage drop amount can be calculated by repeating the operation multiple times.

Embodiment 2

In the embodiment 1, a technique that allows setting the power source voltage as small as possible so as to reduce the power consumption by calculating the voltage drop amount on the anode side or the cathode side according to the video has been described. For example, in the case of an organic EL display having 1920 pixels horizontally and 1080 pixels vertically, it is necessary to solve 1920×1080 first-order simultaneous equations on the anode side or the cathode side. For this reason, an extremely large calculating circuit is necessary, and there is a problem of increased cost.

In the embodiment 2, in order to address this problem, a method for blocking the pixels so as to significantly reduce the operation amount shall be described. More specifically, in the embodiment 2, the voltage drop amount calculating circuit 150 which is the voltage estimating unit calculates a distribution of the amount of voltage drop on the anode side or the cathode side for each of first blocks, and estimates, for each pixel, a distribution of amount of voltage drop generated on the anode side or the cathode side for each pixel, based on the distribution of the amount of voltage drop calculated for the first blocks, each of the first blocks including M pixels obtained by dividing the number of pixels in a row direction and a column direction to be equal, where M is an integer equal to or greater than 2. More specifically, the voltage estimating unit is further (i) calculates a distribution of the amount of voltage drop on the anode side or on the cathode side for each of second blocks including N pixels obtained by dividing the number of pixels in the column direction and the row direction to be equal, where N is an integer equal to or greater than 2 and is different from M, and (ii) estimates a distribution of amount of voltage drop on the power line on the anode side and the cathode side, based on the distribution of the amount of voltage drop calculated for the first blocks and the distribution of the amount of voltage drop calculated for the second blocks.

Note that, the configuration of the display device according to the embodiment 2 is nearly identical to the configuration of the display device 100 according to the embodiment 1, and differs in the function of the voltage drop amount calculating circuit 150 which is an example of the voltage regulating unit.

Figure 16:
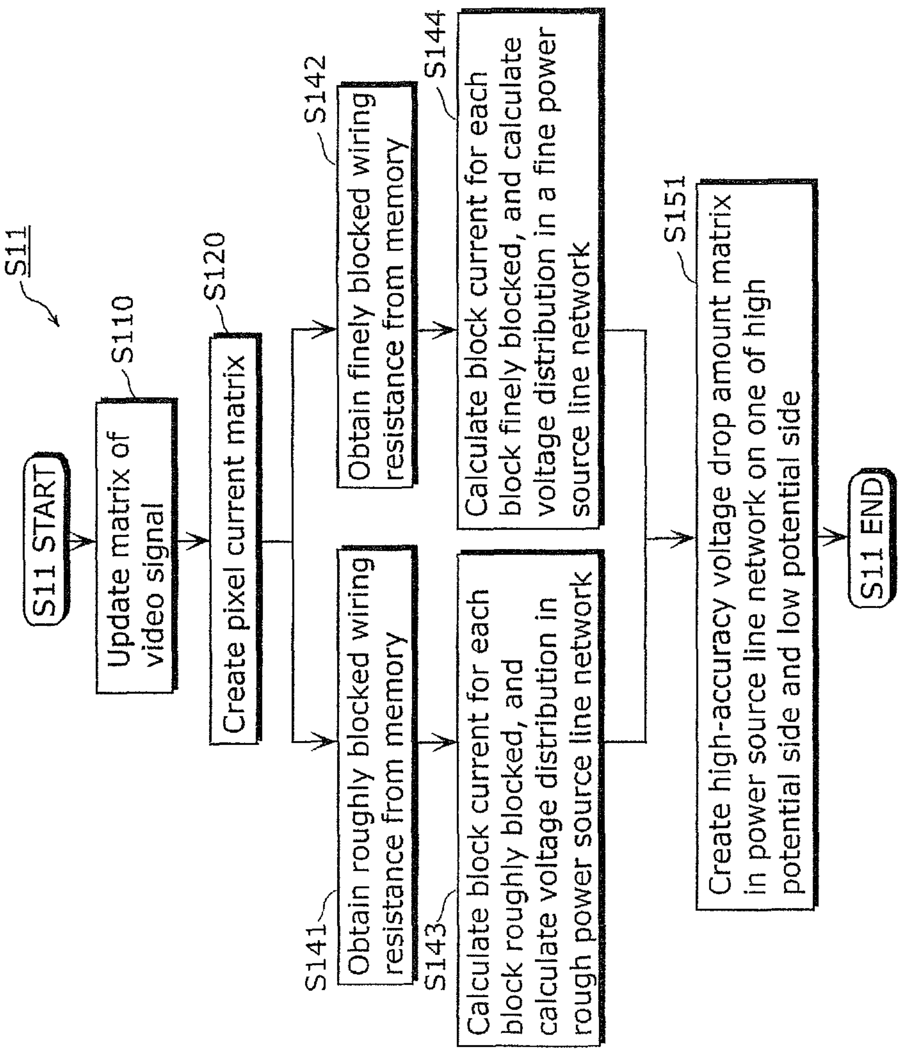
FIG. 16 is a flowchart showing an operation of a display device according to the embodiment 2 of the present disclosure.

FIG. 16 is a flowchart illustrating the operation of the display device according to the embodiment 2. The operational flowchart (step S11) in FIG. 16 is replacing step S10 in the operational flowchart in FIG. 6.

First, the voltage drop amount calculating circuit 150 updates the matrix of the video signal being held (step S110).

Next, the voltage drop amount calculating circuit 150 creates the pixel current matrix from the video signal using the conversion formula or the conversion table of the pixel current of the video signal which is set in advance (step S120).

Next, the voltage drop amount calculating circuit 150 obtains the horizontal resistance component Rch1 and the vertical resistance component Rcv1 of the roughly blocked second power source wire 113 from the memory 155 (step S141).

Next, the voltage drop amount calculating circuit 150 creates a rough resistance wire network by calculating a block current for each roughly-blocked block (step S143). Here, a model of the resistance line network when the blocks are roughly blocked shall be described.

Figure 17:
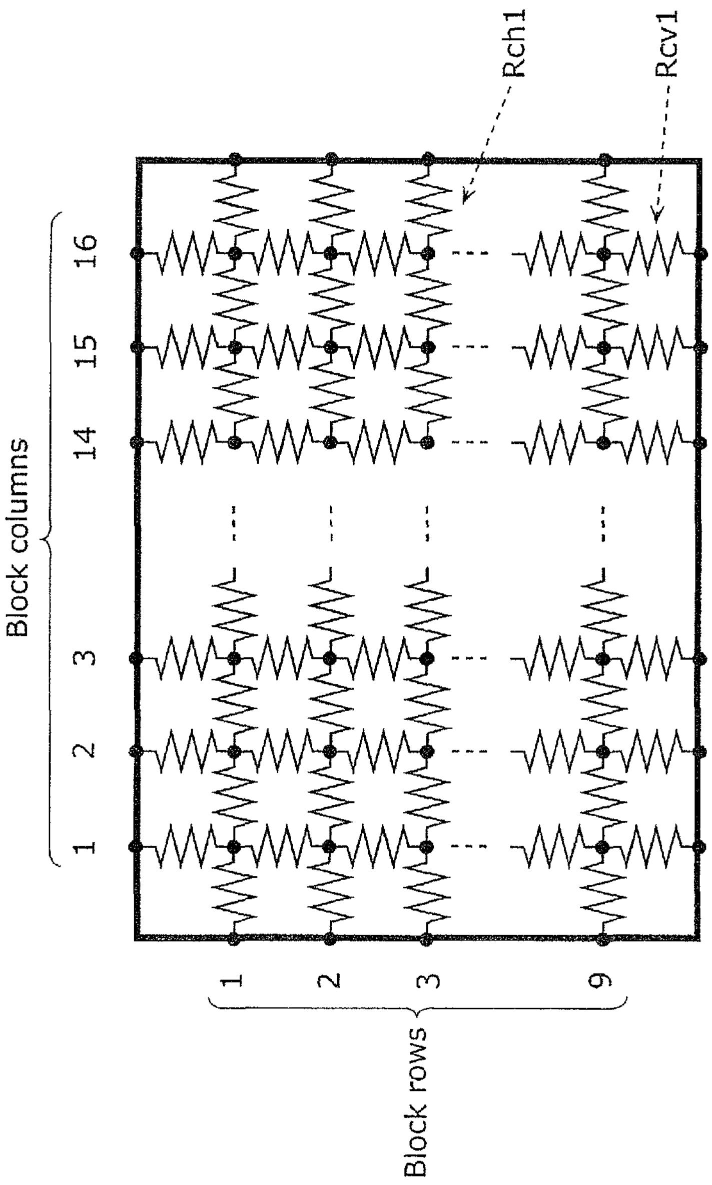
FIG. 17 is a diagram schematically illustrating a model of the second power source wire in an organic EL display unit having 1920 pixels horizontally and 1080 pixels vertically, when one block includes 120 pixels horizontally and 120 pixels vertically.

FIG. 17 is a diagram schematically illustrating a model of the second power source wire 113 in the organic EL display unit 110 having 1920 pixels horizontally and 1080 pixels vertically in which one block includes 120 pixels horizontally and 120 pixels vertically.

Each block is connected to neighboring blocks above, below, and laterally by the horizontal resistance component Rch1 and the vertical resistance component Rcv1, and a peripheral part is connected to the cathode side electrode at which the power source voltage is applied. In other words, it is considered that one block (120×120 pixels) is provided at an intersection of the horizontal resistance component Rch1 and the vertical resistance component Rcv1.

Here, the calculation order of the voltage distribution of second power source wire 113 when the blocks are roughly blocked shall be described.

First, the voltage drop amount calculating circuit 150 calculates block current by calculating a sum of pixel current for each block.

Next, if the voltage drop amount in the second power source wire 113 in a block coordinates (h, v) is vc1 (h, v), and a block current is i1 (h, v), the following equation 2 with respect to the current in the block coordinates (h, v) is derived.

$$\mathrm{Rch1}\times\{vc1(h-1,v)-vc1(h,v)\}+\mathrm{Rch1}\times\{vc1(h+1,v)-vc1(h,v)\}+\mathrm{Rcv1}\times\{vc1(h,v-1)-vc1(h,v)\}+\mathrm{Rcv1}\times\{vc1(h,v+1)-vc1(h,v)\}=i1(h,v) \quad \text{(Equation 2)}$$

Note that h is an integer from 1 to 16, and v is an integer from 1 to 9. Furthermore, vc1 (0, v) and vc1 (17, v), vc1 (h, 0), vc1 (h, 10) are voltage drop amount in the wire from the variable-voltage source 180 to the organic EL display unit 110, and can be approximated to 0 since the voltage drop amount are sufficiently small. In addition, Rch1 is the horizontal resistance component (admittance) of the roughly blocked second power source wire 113, and Rcv1 is the vertical resistance component (admittance) of the roughly blocked second power source wire 113.

By deriving the equation 2 for each block, 16×9 first-order simultaneous equations for 16×9 unknown variables vc1 (h, v) are obtained. By solving the first-order simultaneous equations, the voltage drop amounts vc1 (h, v) of the second power source wire 113 in each block when one block is modeled by the 120 pixels horizontally and 120 pixels vertically can be obtained. To put it differently, the voltage distribution of the second power source wire 113 can be calculated for each block roughly blocked (120 pixels horizontally, 120 pixels vertically).

FIG. 18 is a chart illustrating a voltage drop amount matrix for each block calculated when the blocks are roughly divided. As illustrated in FIG. 18, the voltage drop amount is calculated corresponding to the block row and the block column. For example, the voltage drop amount on a block of the central part of the organic EL display unit 110, that is, the voltage drop amount on the cathode side at the block coordinates (8, 5) is calculated as 9.0 V.

Furthermore, the largest value vc1max in the screen which is the largest voltage drop amount vc1 (h, v) in the second power source wire 113 roughly blocked can be obtained.

In the same manner as the calculation for the voltage drop amount on the cathode side, the voltage drop amount va1 (h, v) on the first power source wire 112 for each block when modeling one block using 120 pixels horizontally and 120 pixels vertically can be obtained by obtaining and solving the simultaneous equations with respect to the first power source wire 112.

In addition, the voltage drop amount calculating circuit 150 obtains the horizontal resistance component Rch2 and the vertical resistance component Rcv2 in the roughly blocked second power source wire 113 from the memory 155 after step S120 (step S142).

Next, the voltage drop amount calculating circuit 150 calculates the block current for each finely-blocked block, and creates a voltage distribution of a fine resistance line network (step S144). Here, a resistance line network model when the blocks are finely divided shall be described.

Figure 19:
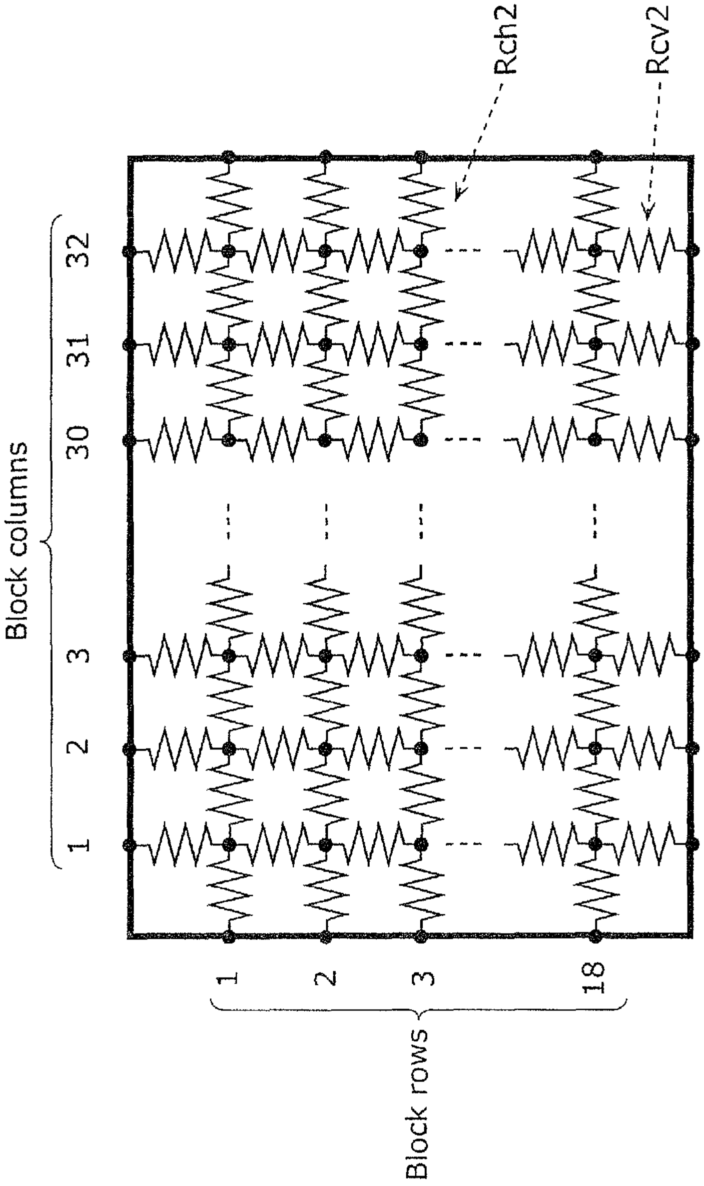
FIG. 19 is a diagram schematically illustrating a model of the second power source wire in an organic EL display unit having 1920 pixels horizontally and 1080 pixels vertically, when one block includes 60 pixels horizontally and 60 pixels vertically.

FIG. 19 is a diagram schematically illustrating the model of the second power source wire 113 when one block is 60 pixels horizontally and 60 pixels vertically in the organic EL display unit 110 having 1920 pixels horizontally and 1080 pixels vertically.

Each block is connected to neighboring blocks above, below, and laterally by the horizontal resistance component Rch2 and the vertical resistance component Rcv2, and a peripheral part is connected to the cathode of the variable-voltage source 180. In other words, it is considered that one block (60 pixels×60 pixels) is provided at an intersection of the horizontal resistance component Rch2 and the vertical resistance component Rcv2.

Here, the calculation order of the voltage distribution of second power source wire 113 when the blocks are finely divided shall be described.

First, the voltage drop amount calculating circuit 150 calculates block current by calculating a sum of pixel current for each block.

Next, if the amount of voltage drop in the second power source wire 113 in block coordinates (h, v) is vc2 (h, v), and a block current is i2 (h, v), the following equation 3 with respect to the current in the block coordinates (h, v) is derived.

$$\mathrm{Rch2}\times\{vc2(h-1,v)-vc2(h,v)\}+\mathrm{Rch2}\times\{vc2(h+1,v)-vc2(h,v)\}+\mathrm{Rcv2}\times\{vc2(h,v-1)-vc2(h,v)\}+\mathrm{Rcv2}\times\{vc2(h,v+1)-vc2(h,v)\}=i2(h,v) \quad \text{(Equation 3)}$$

Note that h is an integer from 1 to 32, and v is an integer from 1 to 18. Furthermore, vc2 (0, v) and vc2 (33, v), vc2 (h, 0), vc2 (h, 19) are the amount of voltage drop in the wire from the variable-voltage source 180 to the organic EL display unit 110, and can be approximated to 0 since the voltage drop amount is sufficiently small. In addition, Rch2 is the horizontal resistance component (admittance) of the roughly blocked second power source wire 113, and Rcv2 is the vertical resistance component (admittance) of the roughly blocked second power source wire 113.

By deriving the equation 3 for each block, 32×18 first order simultaneous equations for 32×18 unknown variables vc2 (h, v) are obtained. By solving the first-order simultaneous equations, the voltage drop amounts vc2 (h, v) of the second power source wire 113 in each block can be obtained when one block is modeled by the 60 pixels horizontally and 60 pixels vertically. To put it differently, the voltage distribution of the second power source wire 113 can be calculated for each finely blocked block (60 pixels horizontally, 60 pixels vertically).

Figures 20, 21:
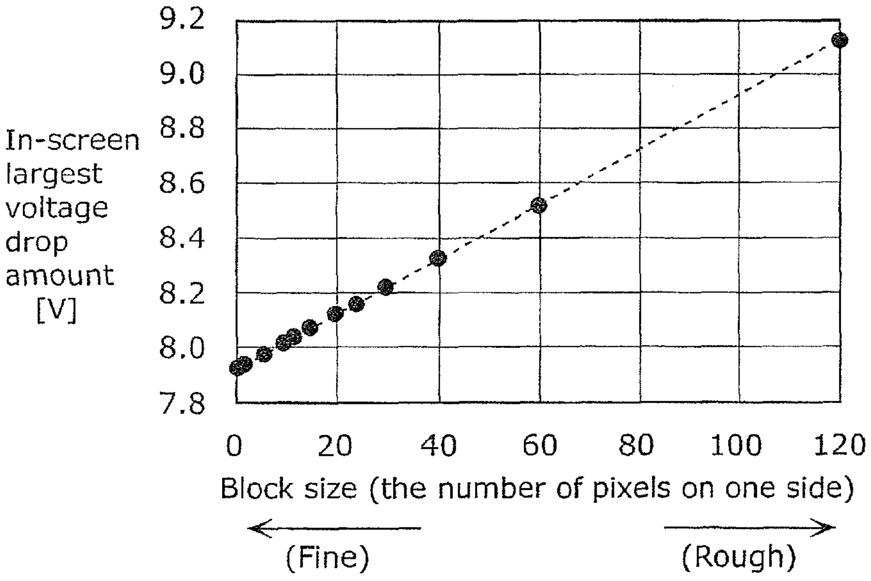
FIG. 20 is a chart illustrating the voltage drop amount matrix for each block when the blocks are finely divided.
FIG. 21 is a graph indicating a relationship, with respect to a video signal, between the number of horizontal and vertical pixels when blocking, and a largest value of voltage drop calculated by the blocked model.

FIG. 20 is a chart illustrating the voltage drop amount matrix for each block when the blocks are finely divided. As illustrated in FIG. 20, the amount of voltage drop is calculated corresponding to the block row and the block column. For example, the voltage drop amount on a block of the central part of the organic EL display unit 110, that is, the voltage drop amount on the cathode side at the block coordinates (16, 9) is calculated as 8.5 V.

Furthermore, the largest value vc2max of the voltage drop in the screen which is the largest voltage drop amount vc2 (h, v) in the second power source wire 113 finely blocked can be obtained.

In the same manner as the calculation for the voltage drop amount on the cathode side, the voltage drop amount vat (h, v) on the first power source wire 112 for each block can be obtained when modeling one block using 60 pixels horizontally and 60 pixels vertically by obtaining and solving the simultaneous equations with respect to the first power source wire 112.

The voltage drop amount calculating circuit 150 then calculates the drop amount of the voltage of the second power source wire 113 from the amount of voltage drop vc1 (h, v) calculated in step S143 and the amount of voltage drop vc2 (h, v) calculated in step S145 for each pixel 111. More specifically, the voltage drop amount matrix in the second power source wire 113 is created by extrapolation, using the amount of voltage drop vc1 (h, v) when the blocks are roughly divided, and the amount of voltage drop vc2 (h, v) when the blocks are finely divided (step S151).

The calculation order of the voltage drop amount for each pixel 111 by extrapolation shall be described.

Although the largest value of the voltage drops vc1max and vc2max from the calculation result when the blocks are divided in two different sizes as described above can be obtained, there will be errors with respect to the actual largest voltage drop value due to blocking. In other words, the largest voltage drop value vc1max of the roughly blocked second power source wire 113 and the largest value vc2max of the finely blocked second power source wire 113 have errors with respect to the largest voltage drop value of the voltage drop in the second power source wire 113 for each pixel 111.

FIG. 21 is a graph indicating a relationship between the number of horizontal and vertical pixels when blocking, and a largest value of voltage drop calculated by the blocked model, with respect to a video signal.

In FIG. 21, the error with respect to the amount of voltage drop calculated for block size 1 (one pixel 111 is included in one block) which is the amount of voltage drop calculated by a larger block size is larger, the larger the block size used for the modeling in order to calculate the amount of voltage drop.

Furthermore, since the relationship between the block size and the error is approximately proportional, it is possible to calculate the extrapolation voltage drop amount with a significantly small error with respect to the voltage drop amount for the block size 1 (one pixel 111 is included in one block) by extrapolating the voltage drop amount calculated by two different block models.

Accordingly, the extrapolation voltage drop amount vcmax for the block size of 1×1 pixel can be calculated by the following equation 4, using the largest value vc1max of the largest voltage drop obtained by a model using a block size of 120×120 pixels, and the largest value vc2max of the largest voltage drop obtained by a model using a block size of 60×60 pixels.

$$Vc\text{max}=vc2\text{max}-(vc1\text{max}-vc2\text{max})\times(60-1)/(120-60) \quad \text{(Equation 4)}$$

In other words, in the embodiment 2, the voltage drop amount calculating circuit 150 calculates the distribution of the voltage drop amount in the second power source wire 113 for each block roughly blocked including the pixels 111 of 120×120 pixels obtained by equally dividing the pixels 111 in the row direction and the column direction, and calculates the voltage drop amount distribution for the second power source wire 113 for a block finely blocked by the pixels 111 of 60×60 pixels obtained by equally dividing the pixels 111 in the row direction and the column direction, and estimates the voltage drop amount distribution in the second power source wire 113 for each pixel 111 based on the distribution of the voltage drop amount calculated for each block roughly blocked and the distribution of the voltage drop distribution for each block finely blocked.

In the same manner, for the first power source wire 112, the voltage drop amount calculating circuit 150 calculates the amount of voltage drop of the first power source wire 112 for each pixel 111 from the voltage drop amount va1 (h, v) in the first power source wire 112 calculated using a resistance line network model roughly blocked and the voltage drop amount va2 (h, v) in the first power source wire 112 calculated by using a finely blocked resistance line network model. More specifically, it is possible to calculate the amount of drop of the voltage in the first power source wire 112 for each pixel 111 by extrapolation using the voltage drop amount va1 (h, v) when the blocks are roughly divided and the voltage drop amount va2 (h, v) when the blocks are finely divided.

As described above, in the method using blocking, 16×9 first-order simultaneous equations and 32×18 first-order simultaneous equations are calculated once, instead of calculating 1920×1080 first-order simultaneous equations once.

Note that, when the Gauss-Jordan elimination is used as a solution to the first-order simultaneous equations, the operation amount increases in proportion to the square of the dimension. Accordingly, the operation amount can be reduced to 1/12 million by the blocking according to the embodiment 2.

According to the embodiment 2, calculating the amount of voltage drop by blocking the blocks into two different sizes by the organic EL display unit 110 allows significantly reducing the operation amount, providing a display device with low-power consumption driving using a relatively low-cost voltage drop amount calculating circuit.

As described above, in comparison with the display device 100 according to the embodiment 1, the display device 100 according to the embodiment 2 calculates the voltage drop amount distribution of the second power source wire 113 for each block including 120×120 pixels 111 obtained by equally dividing the number of pixels 111 in the row direction and the column direction. In addition, the voltage drop amount calculating circuit 150 calculates the distribution of the voltage drop amount in the second power source wire 113 for each block including 60×60 pixels finely blocked by equally dividing the number of pixels 111 in the row direction and the column direction.

With this, the distribution of the voltage drop amount in the second power source wire 113 is estimated for each pixel 111 using the distribution of the amount of voltage drop calculated for each roughly divided block and the distribution of the voltage drop amount calculated for each finely divided block.

With this, the display device according to the embodiment 2 can significantly reduce the operation amount. Thus, it is possible to design space-saving operation circuit, reducing the manufacturing cost.

Note that, the process of calculating the voltage distribution in the roughly blocked second power source wire 113 is an example of the first calculating, and the process of calculating the voltage distribution in the finely blocked second power source wire 113 is an example of the second calculating. The process of calculating the voltage drop amount of the second power source wire 113 for each pixel 111 is an example of sub estimating.

Embodiment 3

In the embodiment 3, a display device that monitors the anode-side potentials of plural pixels to thereby regulate, to a predetermined potential difference, the potential difference between an anode-side potential specified from among the monitored anode-side potentials and the estimated cathode-side potentials of the pixels.

Hereinafter, the embodiment 3 of the present disclosure shall be specifically described with reference to the Drawings.

Figure 22:
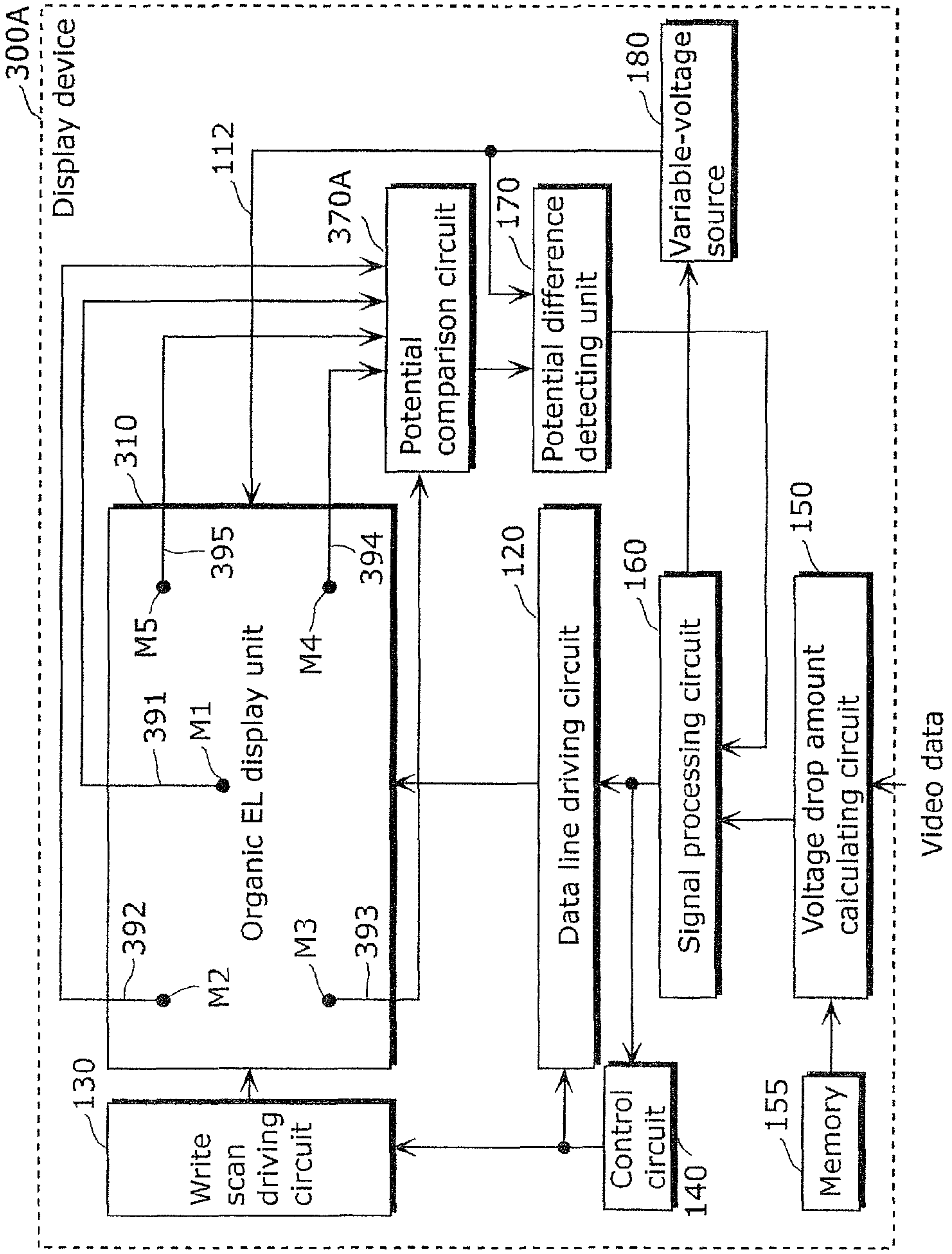
FIG. 22 is a block diagram showing an outline configuration of a display device according to the embodiment 3 of the present disclosure.

FIG. 22 is a block diagram showing an outline configuration of a display device according to the embodiment 3 of the present disclosure.

A display device 300A shown in the figure includes an organic EL display unit 310, a data line driving circuit 120, a write scan driving circuit 130, a control circuit 140, a voltage drop amount calculating circuit 150, a memory 155, a signal processing circuit 160, a potential difference detecting circuit 170, a variable-voltage source 180, monitor wires 391 to 395, and a potential comparison circuit 370A.

The display device 300A according to the embodiment 3 is different from the display device 100 according to the embodiment 1 in that monitor wires for detecting the anode-side potential of the pixels and a potential comparison circuit 370A are included. The horizontal resistance component Rch and the vertical resistance component Rcv of the second power source wire 113 and the configuration and the operation for estimating the voltage drop amount distribution on the cathode side from the video signal is identical to the display device 100 according to the embodiment 1. The description for the components identical to those in the embodiment 1 is omitted, and only the difference shall be described.

The organic EL display unit 310 is nearly identical to the organic EL display unit 110, but is different from the organic EL display unit 110 in that the monitor wires 391 to 395 are provided for measuring the anode-side potentials at the detecting points M1 to M5.

The optimal positions for the monitor pixels 111M1 to 111M5 are determined according to the wiring method for the second power source wire 113 and the values of the horizontal resistance components Rch and Rcv in the second power source wire 113.

Each of the monitor wires 391 to 395 is connected to the corresponding one of the detecting points M1 to M5, and to the potential comparison circuit 370A, and transmits the potential of the corresponding detecting point to the potential comparison circuit 370A.

The potential comparison circuit 370A measures, via each of the monitor wires 391 to 395, the potential of the corresponding detecting point. Stated differently, the potential comparison circuit 370 measures the anode-side potential applied to the monitor pixels 111M1 to 111M5. In addition, the potential comparison circuit 370A selects the lowest potential among the measured anode-side potentials at the detecting points M1 to M5, and outputs the selected potential to the potential difference detecting circuit 170. Note that, when cathode-side potentials are measured, the potential comparison circuit 370A selects the highest one of such potentials, and outputs the selected potential to the potential difference detecting circuit 170.

The potential difference detecting circuit 170, which is the voltage detecting unit according to the present disclosure in this embodiment, receives, from the potential comparison circuit 370A, the lowest potential from among the measured anode-side potentials at the detecting points M1 to M5. The potential difference detecting circuit 170 measures the output voltage from the variable-voltage source 180, and measures the potential difference ΔV between the output voltage and the smallest potential amount in the anode-side potentials. Subsequently, the potential difference detecting circuit 170 outputs the measured potential difference ΔV to the signal processing circuit 160. Accordingly, the potential difference ΔV represents the voltage drop amount on the anode side.

With this, compared to the display device 100 according to the embodiment 1 in which the monitor pixel is limited to one pixel, it is possible to detect the amount of voltage drop at the anode from multiple monitor pixels. Thus, it is possible to regulate the output voltage Vout from the variable-voltage source 180 with higher accuracy. Therefore, power consumption can be effectively reduced even when the size of the organic EL display unit is increased.

Note that, in the display device 300A according to the embodiment 3, the variable-voltage source 180 is the power source supply unit according to the present disclosure, the organic EL display unit 310 is the display unit according to the present disclosure, part of the potential comparison circuit 370A is the voltage detecting unit according to the present disclosure, and the rest of the potential comparison circuit 370A, the potential difference detecting circuit 170 and the signal processing circuit 160 are the voltage regulating unit according to the present disclosure.

Note that, five detecting points are illustrated as the anode-side potential measuring points. However, the detecting points may have to be more than one, and the optimal positions and the number of the detecting points may be determined according to the wiring method of the power source wire and the values of the wire resistance.

In addition, the display device 300A according to the embodiment 3, the potential comparison circuit 370A selects the smallest potential of the anode-side potentials measured at the detecting points M1 to M5, and outputs the selected potential to the potential difference detecting circuit 170. However, it is not limited to this example. For example, the smallest potential difference between the potentials of the anode side of the detecting points M1 to M5, and the cathode-side potentials in the monitor pixels 111M1 to 111M5 in the voltage drop amount distribution of the cathode-side potentials estimated by the voltage drop amount calculating circuit 150 may be selected, and the voltage margin may be calculated based on the selected potential difference.

In addition, the display device 300A according to the embodiment 3 includes a potential comparison circuit 370A and the potential difference detecting circuit 170. However, these circuits do not have to be provided separately.

Figure 23:
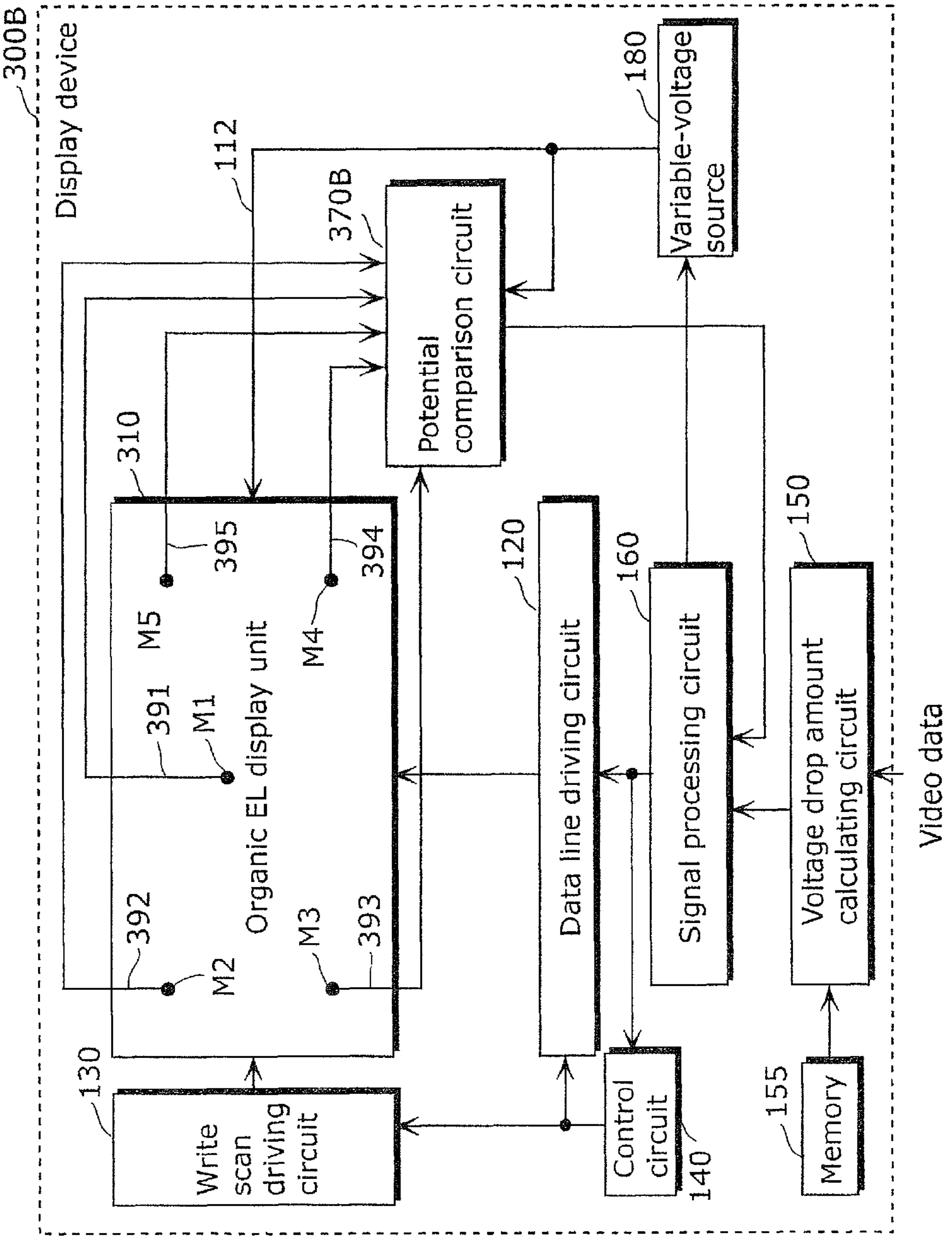
FIG. 23 is a block diagram showing an outline configuration of a display device according to the variation of the embodiment 3 of the present disclosure.

FIG. 23 is a block diagram showing an outline configuration of a display device according to the variation of the embodiment 3 of the present disclosure. The display device 300B in FIG. 23 includes a potential comparison circuit 370B for comparing the output voltage Vout of the variable-voltage source 180 and the potentials at the detecting points M1 to M5, instead of the potential comparison circuit 370A and the potential difference detecting circuit 170. The display device 300B including this configuration is within the scope of the present disclosure, and the display device 300B achieves effects equivalent to the effects achieved by the embodiment 3.

As described above, the display devices 300A and 300B according to the embodiment 3 enables supplying the output voltage Vout which does not cause reduction in luminance in any of the monitor pixels 111M1 to 111M5 to the organic EL display unit 310. In other words, by setting the output voltage Vout to a more appropriate value, power consumption is further reduced and the decrease in luminance of the pixel 111 is suppressed. The following description shall describe this effect with reference to FIGS. 24A to 24B.

Figure 24A:
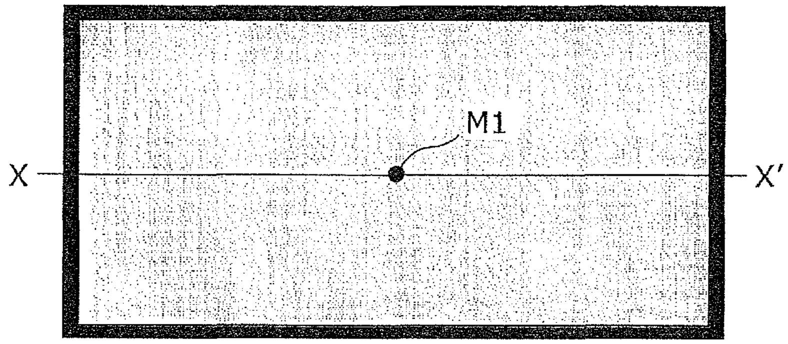
FIG. 24A is a diagram schematically illustrating an example of an image displayed on the organic EL display unit.
Figure 24B:
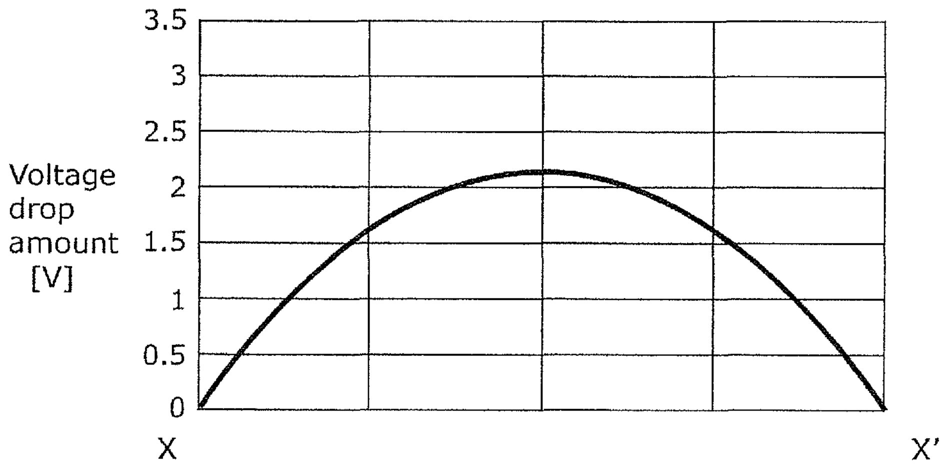
FIG. 24B is a graph indicating the amount of voltage drop in the line x-x'.
Figure 25A:
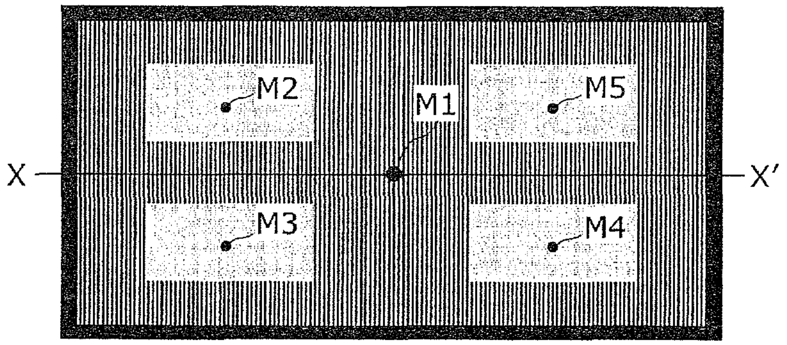
FIG. 25A is a diagram schematically illustrating another example of an image displayed on the organic EL display unit according to the embodiment 3.
Figure 25B:
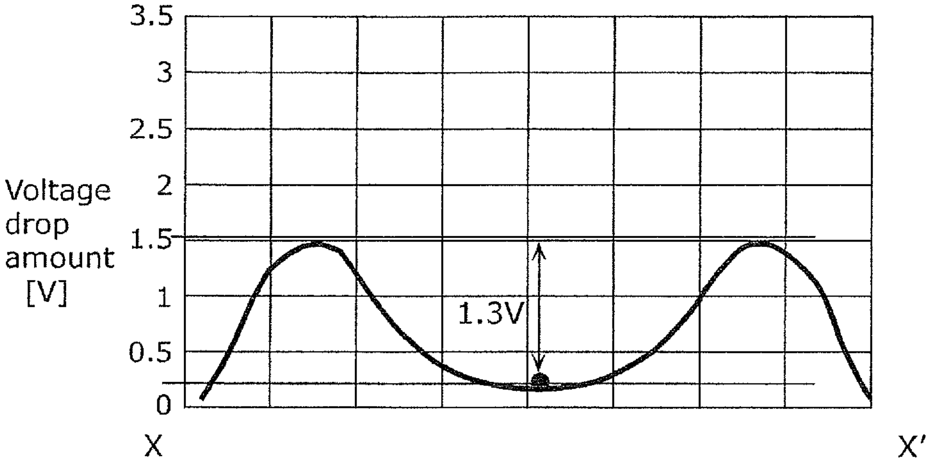
FIG. 25B is a graph indicating the amount of voltage drop at the first power source wire in the line x-x'.

FIG. 24A is a diagram schematically illustrating an example of the image displayed on the organic EL display unit 310. FIG. 24B is a graph illustrating the amount of voltage drop in the first power source wire 112 along the line x-x' when the image illustrated in FIG. 24A is displayed. FIG. 25A is a diagram schematically illustrating an example of the image displayed on the organic EL display unit 310. FIG. 25B is a graph illustrating the voltage drop amount in the first power source wire 112 along the line x-x' when the image illustrated in FIG. 25A is displayed.

As illustrated in FIG. 24A, when all of the pixels 111 emit light in the same luminance, the amount of voltage drop in the first power source wire 112 is as illustrated in FIG. 24B.

Accordingly, checking the potential at the detecting point M1 at the center of the screen indicates the worst case of the voltage drop. Accordingly, by adding the voltage margin Vdrop corresponding to the voltage drop amount ΔV to VTFT+VEL causes all of the pixels 111 in the organic EL display unit 310 to emit light with precise luminance.

In contrast, as illustrated in FIG. 25A, a pixel 111 at the center of a region obtained by vertically and horizontally bisecting the screen, that is, a region obtained by dividing the screen into four regions emits light with the same luminance and other pixels 111 does not emit light, the amount of voltage drop in the first power source wire 112 is as illustrated in FIG. 25B.

Accordingly, when measuring the anode-side potential only at the detecting point M1 at the center of the screen, it is necessary to set the voltage calculated by adding an offset potential to the detected potential as the voltage margin on the anode side. For example, setting the voltage margin conversion table such that the voltage corresponding to the voltage to which an offset of 1.3 V is always added to the voltage drop amount at the center of the screen (0.2 V) causes all of the pixels 111 in the organic EL display unit 310 to emit light with a precise luminance. Here, producing luminescence at a precise luminance means that the driving transistor 125 of the pixel 111 is operating in the saturation region.

However, in this case, 1.3 V is always necessary as the voltage margin on the anode side, decreasing the effects on reducing the power consumption. For example, in the case of an image with the voltage drop amount on the anode side is 0.1 V, 0.1+1.3=1.4 V is held as the voltage margin on the anode side. Thus, the output voltage Vout is increased as much as the voltage margin, decreasing the effects on reducing the power consumption.

Accordingly, dividing the screen into four regions and measuring the potentials at the center of the regions, and the center of the entire screen, that is, the detecting points M1 to M5 as illustrated in FIG. 25A, not just the detecting point M1 at the center of the screen increases the accuracy of detecting the voltage drop amount on the anode side. Therefore, it is possible to reduce the additional offset amount and increase the power consumption reducing effect.

For example, in FIGS. 25A and 25B, when the potential at the detecting points M2 to M5 is 1.3 V, setting the voltage with an offset of 0.2 V added as the voltage margin on the anode side causes all of the pixels 111 to emit light with a precise luminance.

In this case, even if the image causes the actual amount of voltage drop on the anode side is 0.1 V, the value set as the voltage margin on the anode side is 0.1+0.2=0.3 V. Thus, compared to a case in which only the potential at the detecting point M1 at the center of the screen is measured, it is possible to reduce the power source voltage of 1.1 V.

As described above, compared to the display device 100, the display devices 300A and 300B have more detecting points, allowing regulating the output voltage Vout according to the largest value of the amount of voltage drop. Therefore, power consumption can be effectively reduced even when the size of the organic EL display unit 310 is increased.

Although only some exemplary embodiments of the present disclosure have been described in detail above, those skilled in the art will readily appreciate that many modifications are possible in the embodiments 1 to 3 without materially departing from the novel teachings and advantages of the present disclosure. Accordingly, all such modifications and devices incorporating the display device according to the present disclosure are intended to be included within the scope of the present disclosure.

For example, the reduction in the luminance of the pixels on which monitor wire is provided in the organic EL display unit may be compensated.

Figure 26:
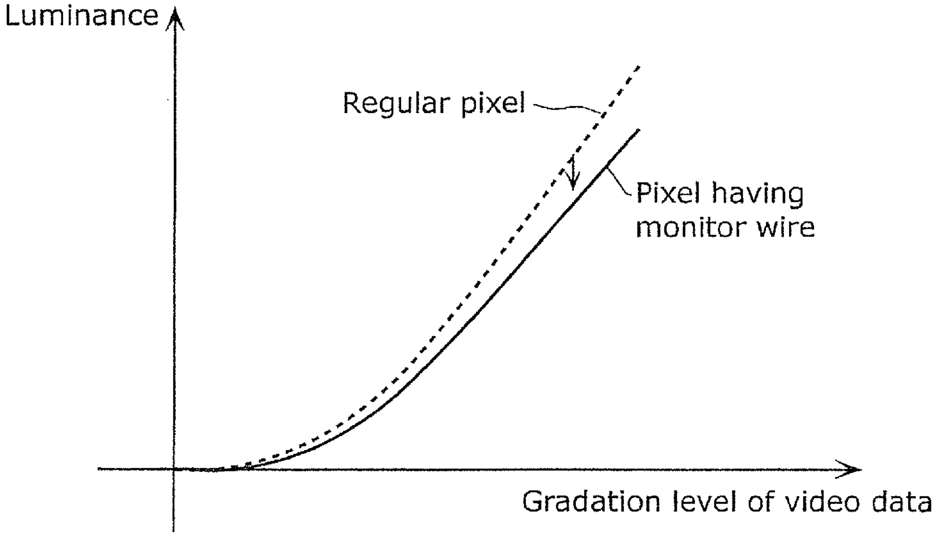
FIG. 26 is a graph illustrating luminance of the light emitted from a regular pixel and luminance of the light emitted from a pixel having a monitor wire, corresponding to gradation levels of the video data.

FIG. 26 is a graph illustrating luminance of the light emitted from a regular pixel and luminance of the light emitted from a pixel having a monitor wire, corresponding to gradation levels of the video data. Note that a normal pixel refers to a pixel among the pixels of the organic EL display unit, other than the pixel provided with a monitor wire.

Figure 27:
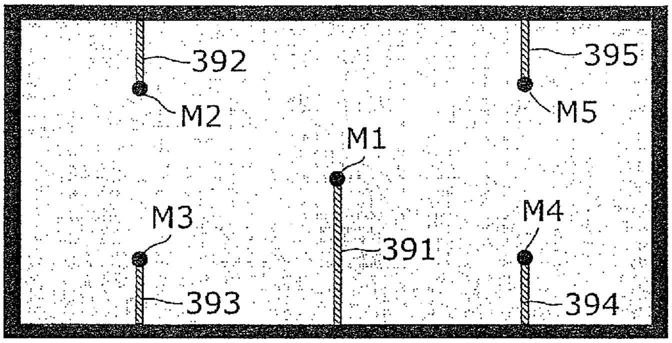
FIG. 27 schematically illustrates an image having line defects.

As clearly shown in FIG. 26, when the gradation level of the video data is the same, the luminance of the pixel including the monitor wire is lower than the luminance of the regular pixel. This is because, with the provision of a monitor wire, the capacitance value of the capacitor 126 of the pixel decreases. Therefore, even when video data which causes luminance of the light emitted to be with the same luminance evenly throughout the entirety of the organic EL display unit is inputted, the image to be displayed on the organic EL display unit is an image in which the luminance of the pixels having a monitor wire is lower than the luminance of the other pixels. In other words, line defects occur. FIG. 27 is a diagram schematically illustrates an image with line defects.

In order to prevent the line defect, the display device may correct the signal voltage supplied to the organic EL display unit from the data line drive circuit 120. Specifically, since the positions of the pixels having a monitor wire are known at the time of designing, it is sufficient to pre-set the signal voltage to be provided to the pixels in such locations higher by the amount of drop in luminance. With this, it is possible to prevent line defects caused by the provision of monitor wires.

Although the description has been made that the signal processing circuit includes a required voltage conversion table indicating required voltage of VTFT+VEL corresponding to the gradation level of each color, a current-voltage characteristic of the drive transistor 125 and current-voltage characteristic of the organic EL element 121 are included, and VTFT+VEL may be determined using two current-voltage characteristics.

Figure 28:
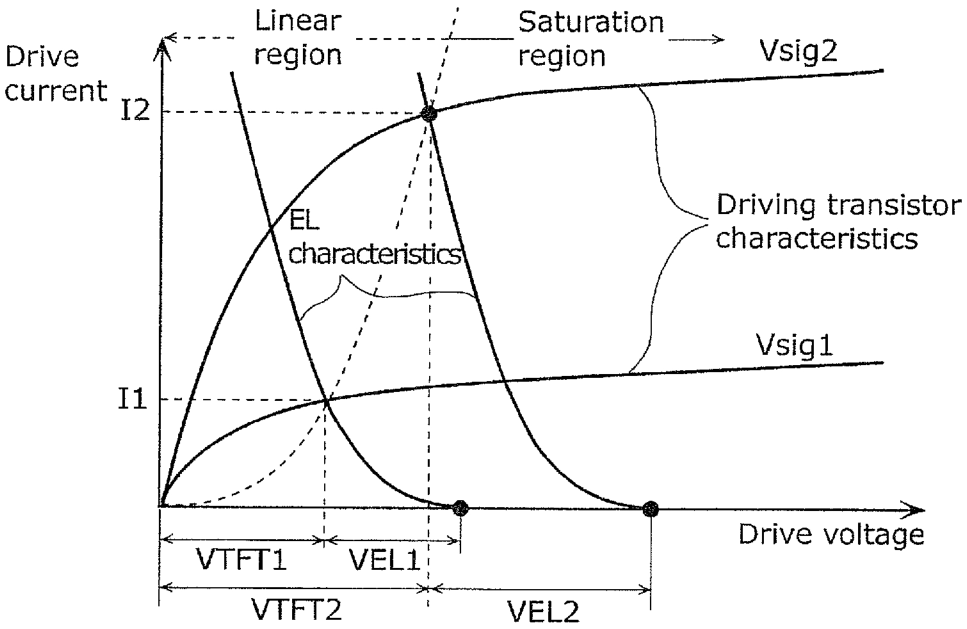
FIG. 28 is a graph illustrating current-voltage characteristics of the driving transistor and current-voltage characteristics of the organic EL element.

FIG. 28 is a graph illustrating current-voltage characteristics of the drive transistor and current-voltage characteristics of the organic EL element. In the horizontal axis, the direction of dropping with respect to the source potential of the driving transistor is the positive direction.

FIG. 28 illustrates the current-voltage characteristics of the drive transistor and the current-voltage characteristics of the organic EL element corresponding to the two different gradation levels, and the current-voltage characteristic of the drive transistor corresponding to a low gradation level is represented as Vsig1, and the current-voltage characteristic of the drive transistor corresponding to a high gradation level is represented as Vsig2.

In order to eliminate the effect of the display defect caused by the change in the drain-source voltage in the drive transistor, it is necessary for the drive transistor to operate in the saturation region. On the other hand, the pixel luminescence of the organic EL element is determined according to the drive current. Therefore, in order to cause the organic EL element to emit light precisely in accordance with the gradation level of video data, it is sufficient that the voltage remaining after the drive voltage (VEL) of the organic EL element corresponding to the drive current of the organic EL element is subtracted from the voltage between the source electrode of the driving transistor and the cathode electrode of the organic EL element is a voltage that can cause the driving transistor to operate in the saturation region. Furthermore, in order to reduce power consumption, it is preferable that the drive voltage (VTFT) of the driving transistor be low.

Therefore, in FIG. 28, the organic EL element emits light precisely in accordance with the gradation of the video data and power consumption is lowest with the VTFT+VEL that is obtained through the characteristics passing the point of intersection of the current-voltage characteristics of the driving transistor and the current-voltage characteristics of the organic EL element on the line indicating the boundary between the linear region and the saturation region of the driving transistor.

As described above, the required voltage VTFT+VEL corresponding to the gradations for each color may be calculated using the graph shown in FIG. 28.

With this, power consumption can be further reduced.

Furthermore, in the embodiment 1, the signal processing circuit may change the first reference voltage Vref1 for multiple frames (for example, each 3 frames), instead of changing the first reference voltage Vref1 for one frame.

With this, the potential on the first reference voltage Vref1 changes, and thus the power consumption generated at the variable-voltage source 180 can be reduced.

Alternatively, the signal processing circuit may measure the potential differences outputted from the potential difference detecting circuit and the potential comparison circuit over plural frames, average the measured potential differences which are measured amounts of voltage drop on the anode side, and regulate the variable-voltage source in accordance with the average potential difference and the voltage drop (increase) amount on the cathode side estimated by the voltage drop amount calculating circuit. More specifically, in the flowchart illustrated in FIG. 6, after detecting the potential at the detecting point in the flowchart illustrated in FIG. 6 (step S20) for multiple frames, and in determining the voltage margin (step S430), the potential differences for multiple frames detected by the detecting process of the potential differences (step S20) are averaged, and the voltage margin may be determined corresponding to the averaged potential difference.

Furthermore, the signal processing circuit may determine the first reference voltage Vref1 considering an aging deterioration margin for the organic EL element 121. For example, assuming that the aged deterioration margin for the organic EL element 121 is Vad, the signal processing circuit 160 may determine the voltage of the first reference voltage Vref1 to be VTFT+VEL+Vdrop+Vad.

Note that, in the embodiments 1 to 3, an example in which the potential on the anode side is measured and detected by the monitor pixel, and the potential on the cathode side is estimated by the voltage distribution of the power source wire network. However, the potential on the anode side may be calculated based on the estimation of the voltage drop amount distribution by the voltage drop amount calculating circuit, and the potential on the cathode side may be measured and detected by the monitor pixel.

Furthermore, although the switch transistor 124 and the driving transistor 125 are described as being p-type transistors in the above-described embodiments, they may be configured of n-type transistors.

Furthermore, although the switch transistor 124 and the driving transistor 125 are TFTs, they may be other field-effect transistors.

Furthermore, the processing units included in the display devices according to the embodiments 1 to 3 described earlier are typically implemented as an LSI which is an integrated circuit. Note that part of the processing units included in the display devices can also be integrated in the same substrate as the organic EL display units 110 and 310. Furthermore, they may be implemented as a dedicated circuit or a general-purpose processor. Furthermore, a Field Programmable Gate Array (FPGA) which allows programming after LSI manufacturing or a reconfigurable processor which allows reconfiguration of the connections and settings of circuit cells inside the LSI may be used.

Furthermore, part of the functions of the data line driving circuit, the write scan driving circuit, the control circuit, the peak signal detecting circuit, the signal processing circuit, and the potential difference detecting circuit included in the display devices according to the embodiments 1 to 3 of the present disclosure may be implemented by having a processor such as a CPU executing a program. Furthermore, the present disclosure may also be implemented as a display device driving method including the characteristic steps implemented through the respective processing units included in the display devices.

Furthermore, although the foregoing descriptions exemplify the case where the display devices are active matrix-type organic EL display devices according to the embodiments 1 to 3, the present disclosure may be applied to organic EL display devices other than the active matrix-type, and may be applied to a display device other than an organic EL display device using a current-driven light-emitting element, such as a liquid crystal display device.

Figure 29:
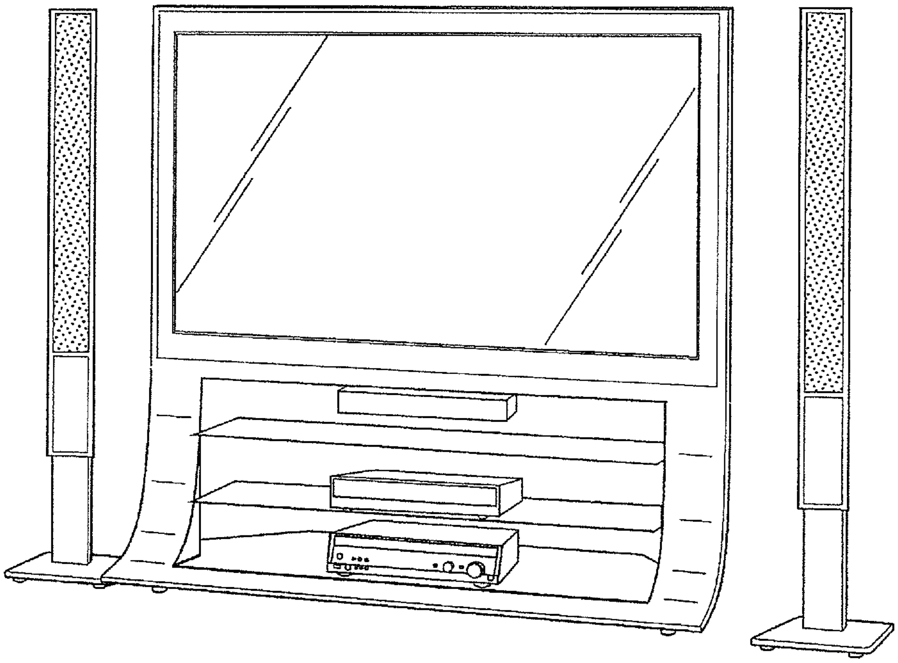
FIG. 29 is an external view of a thin flat TV in which the display device according to the present disclosure is incorporated.

Furthermore, for example, the display device according to the present disclosure is built into a thin, flat TV shown in FIG. 29. A thin, flat-screen TV capable of high-accuracy image display reflecting a video signal is implemented by having the display device according to the present disclosure built into the TV.

Industrial Applicability

The present disclosure is particularly useful for an active-matrix organic EL flat panel display.

The invention claimed is:

1. A display device, comprising:

a power supply configured to supply an output potential on a high-potential side and an output potential on a low-potential side;

a display including:

a plurality of pixels arranged in a matrix;

a power line on the high-potential side and a power line on the low-potential side that are connected to each of the pixels, and configured to receive power from the power supply;

a voltage detector configured to detect a potential on one of the high-potential side and the low-potential side among potentials applied to at least one of the pixels in the display;

a voltage estimator configured to calculate an amount of voltage drop generated in the power line on the other of the high-potential side and the low-potential side from video data, which is data indicating luminance of each of the pixels, and to estimate a potential at, at least one point of the power line; and a voltage regulator configured to regulate at least one output potential on one of the high-potential side and the low-potential side to be supplied from the power supply such that a potential difference between the potential on one of the high-potential side and the low-potential side detected by the voltage detector and the potential at the at least one point of the power line estimated by the voltage estimator reaches a predetermined potential difference, wherein each of the pixels includes a driver and a light-emitting element, the voltage regulator is configured to regulate the at least one output potential to reduce a drive voltage of the driver within a range in which the driver operates in a saturation region and the light-emitting element emits light substantially at the luminance, and the predetermined potential difference is represented by VTFT+VEL+Vdrop−ΔV, where VTFT indicates a voltage required for the driver, VEL indicates a voltage required for the light-emitting element, ΔV indicates a potential difference between a potential output from the power supply and a potential detected by the voltage detector, and Vdrop indicates a voltage margin corresponding to ΔV.

2. The display device according to claim 1, wherein the voltage estimator is configured to calculate a distribution of the amount of voltage drop for each of first blocks, and to estimate, for each pixel, an amount of voltage drop generated on the power line on the other of the high-potential side and the low-potential side for each pixel, based on the distribution of the amount of voltage drop calculated for the first blocks, each of the first blocks including M pixels obtained by dividing the number of pixels in a row direction and a column direction to be equal, where M is an integer equal to or greater than 2.

3. The display device according to claim 2, wherein the voltage estimator is further configured (i) to calculate a distribution of the amount of voltage drop for each of second blocks including N pixels obtained by dividing the number of pixels in the column direction and the row direction to be equal, where N is an integer equal to or greater than 2 and is different from M, and (ii) to estimate an amount of voltage drop on the power line on the other of the high-potential side and the low-potential side, based on the distribution of the amount of voltage drop calculated for the first blocks and the distribution of the amount of voltage drop calculated for the second blocks.

4. The display device according to claim 1, wherein the voltage regulator regulates the at least one output potential on the high-potential side and the low-potential side to be supplied from the power supply, using a largest value in the distribution of the amount of voltage drop estimated.

5. The display device according to claim 1, wherein the voltage detector is configured to detect potentials of the plurality of pixels in the display.

6. The display device according to claim 5, wherein the voltage regulator is configured to select a smallest potential of potentials on the high-potential side detected by the voltage detector or a largest potential of potentials on the low-potential side detected by the voltage detector, and to regulate the power supply based on the selected potential.

7. The display device according to claim 1, further comprising:

a high-potential side detecting line having one end connected to the pixel at which the potential on the high-potential side is detected and the other end connected to the voltage regulator, and transmitting the potential on the high-potential side; or a low-potential side detecting line having one end connected to the pixel at which the potential on the low-potential side is detected and the other end connected to the voltage regulator, and transmitting the potential on the low-potential side.

8. The display device according to claim 1, wherein each of the pixels includes:

a driving element including a source electrode and a drain electrode; and a light-emitting element including a first electrode and a second electrode, the first electrode is connected to one of the source electrode and the drain electrode of the driving element, one of (i) the other of the source electrode and the drain electrode and (ii) the second electrode is connected to one of the power lines on the high-potential side and the low-potential side, and the other of the source electrode and the drain electrode and the other of the second electrode are connected to the other of the power lines on the high-potential side and the low-potential side.

9. The display device according to claim 8, wherein the second electrode configures a part of a common electrode provided in common with the pixels, and the common electrode is electrically connected to the power supply such that the potential is applied from a periphery of the common electrode.

10. The display device according to claim 9, wherein the second electrode is a transparent conductive material of a metal oxide.

11. The display device according to claim 8, wherein the light-emitting element is an organic EL element.

12. The display device according to claim 1, wherein the output potential regulation reduces power consumption of each of the pixels without substantially changing the luminance.

13. A display device, comprising:

a power supply configured to supply an output potential on a high-potential side and an output potential on a low-potential side;

a display including:

a plurality of pixels arranged in a matrix;

a power line on the high-potential side and a power line on the low-potential side that are connected to each of the pixels, and configured to receive power from the power supply;

a voltage detector configured to detect a potential on one of the high-potential side and the low-potential side among potentials applied to at least one of the pixels in the display;

a voltage estimator configured to calculate an amount of voltage drop generated in the power line on the other of the high-potential side and the low-potential side from video data which is data indicating luminance of each of the pixels, and to estimate a potential at, at least one point of the power line; and a voltage regulator configured to regulate at least one output potential on one of the high-potential side and the low-potential side to be supplied from the power supply such that a potential difference between the potential on one of the high-potential side and the low-potential side detected by the voltage detector and the potential at the at least one point of the power line estimated by the voltage estimator reaches a predetermined potential difference, wherein each of the pixels includes a driver and a light-emitting element, the voltage regulator is configured to regulate the at least one output potential such that as the at least one output potential increases the potential difference also increases, and the predetermined potential difference is represented by VTFT+VEL+Vdrop−ΔV, where VTFT indicates a voltage required for the driver, VEL indicates a voltage required for the light-emitting element, ΔV indicates a potential difference between a potential output from the power supply and a potential detected by the voltage detector, and Vdrop indicates a voltage margin corresponding to ΔV.

14. The display device according to claim 13, wherein voltage regulator is configured to regulate the output potential to reduce a drive voltage of the driver within a range in which the driver operates in a saturation region and the light-emitting element emits light substantially at the luminance.

15. The display device according to claim 14, wherein the output potential regulation reduces power consumption of each of the pixels without substantially changing the luminance.

16. A display device, comprising:

a power supply configured to supply an output potential on a high-potential side and an output potential on a low-potential side;

a display including:

a plurality of pixels arranged in a matrix;

a power line on the high-potential side and a power line on the low-potential side that are connected to each of the pixels, and configured to receive power from the power supply and to supply a driving current to the pixels;

a voltage detector configured to detect a potential on one of the high-potential side and the low-potential side among potentials applied to at least one of the pixels in the display;

a voltage estimator configured to calculate an amount of voltage drop generated in the power line on the other of the high-potential side and the low-potential side from video data, which is data indicating luminance of each of the pixels, and to estimate a potential at, at least one point of the power line; and a voltage regulator configured to regulate at least one output potential on one of the high-potential side and the low-potential side to be supplied from the power supply such that a potential difference between the potential on one of the high-potential side and the low-potential side detected by the voltage detector and the potential at the at least one point of the power line estimated by the voltage estimator reaches a predetermined potential difference, wherein each of the pixels includes a driver and a light-emitting element, the display further includes:

a high-potential side detecting line having one end connected to the pixel at which the potential on the high-potential side is detected and the other end connected to the voltage regulator, and for transmitting the potential on the high-potential side; or a low-potential side detecting line having one end connected to the pixel at which the potential on the low-potential side is detected and the other end connected to the voltage regulator, and for transmitting the potential on the low-potential side and the high-potential side detecting line and the low-potential side detecting line are not capable of supplying a driving current to the pixels, and the predetermined potential difference is represented by VTFT+VEL+Vdrop−ΔV, where VTFT indicates a voltage required for the driver, VEL indicates a voltage required for the light-emitting element, ΔV indicates a potential difference between a potential output from the power supply and a potential detected by the voltage detector, and Vdrop indicates a voltage margin corresponding to ΔV.

17. The display device according to claim 16, wherein voltage regulator is configured to regulate the output potential to reduce a drive voltage of the driver within a range in which the driver operates in a saturation region and the light-emitting element emits light substantially at the luminance.

18. The display device according to claim 17, wherein the output potential regulation reduces power consumption of each of the pixels without substantially changing the luminance.

19. A display device, comprising:

a power supply configured to supply an output potential on a high-potential side and an output potential on a low-potential side;

a display including:

a plurality of pixels arranged in a matrix;

a power line on the high-potential side and a power line on the low-potential side that are connected to each of the pixels, and configured to receive power from the power supply;

a voltage detector configured to detect a potential on one of the high-potential side and the low-potential side among potentials applied to at least one of the pixels in the display;

a voltage estimator configured to calculate an amount of voltage drop generated in the power line on the other of the high-potential side and the low-potential side from video data which is data indicating luminance of each of the pixels and to estimate a potential at, at least one point of the power line; and a voltage regulator configured to regulate at least an output potential on one of the high-potential side and the low-potential side to be supplied from the power supply such that a potential difference between the potential on one of the high-potential side and the low-potential side detected by the voltage detector and the potential at the at least one point of the power line estimated by the voltage estimator reaches a predetermined potential difference, wherein each of the pixels includes a driver and a light-emitting element, the predetermined potential difference is represented by VTFT+VEL+Vdrop−ΔV, where VTFT indicates a voltage required for the driver, VEL indicates a voltage required for the light-emitting element, ΔV indicates a potential difference between a potential output from the power supply and a potential detected by the voltage detector, and Vdrop indicates a voltage margin corresponding to ΔV.

* * * * *